(12) United States Patent
Bunker et al.

(10) Patent No.: US 10,563,514 B2
(45) Date of Patent: Feb. 18, 2020

(54) FASTBACK TURBULATOR

(71) Applicant: General Electric Company, Schenectady, NY (US)

(72) Inventors: Ronald Scott Bunker, West Chester, OH (US); Robert David Briggs, West Chester, OH (US); Shawn Michael Pearson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 409 days.

(21) Appl. No.: 15/314,618

(22) PCT Filed: May 29, 2015

(86) PCT No.: PCT/US2015/033240
§ 371 (c)(1),
(2) Date: Nov. 29, 2016

(87) PCT Pub. No.: WO2015/184294
PCT Pub. Date: Dec. 3, 2015

(65) Prior Publication Data
US 2017/0096900 A1 Apr. 6, 2017

Related U.S. Application Data

(60) Provisional application No. 62/004,693, filed on May 29, 2014, provisional application No. 62/004,682, (Continued)

(51) Int. Cl.
*F01D 5/14* (2006.01)
*F01D 9/04* (2006.01)
(Continued)

(52) U.S. Cl.
CPC .............. *F01D 5/145* (2013.01); *F01D 9/04* (2013.01); *F01D 5/141* (2013.01); *F01D 5/187* (2013.01);
(Continued)

(58) Field of Classification Search
CPC . F01D 5/145; F01D 9/04; F01D 5/141; F01D 5/187; F01D 25/12; F23R 3/005;
(Continued)

(56) References Cited

U.S. PATENT DOCUMENTS 4,293,275 A 10/1981 Kobayashi et al.
4,416,585 A 11/1983 Abdel-Messeh
(Continued)

FOREIGN PATENT DOCUMENTS

DE 195269917 A1 1/1997
DE 102008037384 A1 4/2009
(Continued)

OTHER PUBLICATIONS

European Search Report and Opinion issued in connection with related EP Application No. 15168677.1 dated Nov. 2, 2015.
(Continued)

*Primary Examiner* — Jacob M Amick
*Assistant Examiner* — Charles Brauch
(74) *Attorney, Agent, or Firm* — McGarry Bair PC

(57) ABSTRACT

A structure for disrupting the flow of a fluid is provided, the structure comprising: a first lateral wall and a second lateral wall spaced apart from one another a distance across an X-axis; and a turbulator extending between the first lateral wall and the second lateral wall, the turbulator extending away from the floor. The turbulator includes a first front surface extending between the first lateral wall and the second lateral wall, a second front surface extending between the first lateral wall and the second lateral wall, a
(Continued)

first rear surface extending between the first lateral wall and the second lateral wall, the first rear surface extending between the first front surface and the floor, and a second rear surface adjoining the first rear surface and extending between the first lateral wall and the second lateral wall, the second rear surface extending between the second front surface and the floor.

56 Claims, 12 Drawing Sheets

Related U.S. Application Data filed on May 29, 2014, provisional application No. 62/004,677, filed on May 29, 2014.

(51) Int. Cl.
  *F23R 3/00* (2006.01)
  *F01D 25/12* (2006.01)
  *F01D 5/18* (2006.01)

(52) U.S. Cl.
  CPC .......... *F01D 25/12* (2013.01); *F05D 2220/30* (2013.01); *F05D 2240/127* (2013.01); *F05D 2260/2212* (2013.01); *F23R 3/005* (2013.01); *F23R 2900/03045* (2013.01); *Y02T 50/673* (2013.01); *Y02T 50/676* (2013.01)

(58) Field of Classification Search
  CPC ..... F23R 2900/03045; F05D 2240/127; F05D 2220/30; F05D 2260/2212; Y02T 50/673; Y02T 50/676
  See application file for complete search history.

(56) References Cited

U.S. PATENT DOCUMENTS

| | | |
|---|---|---|
| 4,446,693 A | 5/1984 | Pidcock et al. |
| 4,474,532 A | 10/1984 | Pazder |
| 4,515,526 A | 5/1985 | Levengood |
| 4,669,957 A | 6/1987 | Phillips et al. |
| 4,775,296 A | 10/1988 | Schwarzmann et al. |
| 5,062,768 A | 11/1991 | Marriage |
| 5,096,379 A | 3/1992 | Stroud et al. |
| 5,288,207 A | 2/1994 | Linask |
| 5,344,283 A | 9/1994 | Magowan et al. |
| 5,361,828 A | 11/1994 | Lee et al. |
| 5,382,133 A | 1/1995 | Moore et al. |
| 5,395,212 A | 3/1995 | Anzai et al. |
| 5,603,606 A | 2/1997 | Glezer et al. |
| 5,611,662 A | 3/1997 | Cunha |
| 5,626,017 A | 5/1997 | Sattelmayer |
| 5,681,144 A | 10/1997 | Spring et al. |
| 5,695,321 A * | 12/1997 | Kercher .................. F01D 5/187 415/115 |
| 5,704,763 A | 1/1998 | Lee |
| 5,779,438 A | 7/1998 | Wilfert |
| 5,797,726 A | 8/1998 | Lee |
| 6,000,466 A | 12/1999 | Aoyagi et al. |
| 6,026,892 A | 2/2000 | Kim et al. |
| 6,099,251 A | 8/2000 | Lafleur |
| 6,174,134 B1 | 1/2001 | Lee et al. |
| 6,234,755 B1 | 5/2001 | Bunker et al. |
| 6,241,468 B1 | 6/2001 | Lock et al. |
| 6,254,346 B1 | 7/2001 | Fukuno et al. |
| 6,287,075 B1 | 9/2001 | Kercher |
| 6,331,098 B1 | 12/2001 | Lee |
| 6,368,060 B1 | 4/2002 | Fehrenbach et al. |
| 6,383,602 B1 | 5/2002 | Fric et al. |
| 6,406,260 B1 | 6/2002 | Trindade et al. |
| 6,416,283 B1 | 7/2002 | Johnson et al. |
| 6,547,524 B2 | 4/2003 | Kohli et al. |
| 6,582,584 B2 | 6/2003 | Lee et al. |
| 6,607,355 B2 | 8/2003 | Cunha et al. |
| 6,609,884 B2 | 8/2003 | Harvey |
| 6,644,921 B2 | 11/2003 | Bunker et al. |
| 6,722,134 B2 | 4/2004 | Bunker et al. |
| 6,868,060 B2 | 3/2005 | Barzegar et al. |
| 6,890,154 B2 | 5/2005 | Cunha |
| 6,896,509 B2 | 5/2005 | Carroni et al. |
| 6,916,150 B2 | 7/2005 | Liang |
| 6,932,573 B2 | 8/2005 | Liang |
| 6,939,102 B2 | 9/2005 | Liang |
| 6,981,846 B2 | 1/2006 | Liang |
| 6,984,102 B2 | 1/2006 | Bunker et al. |
| 7,094,031 B2 | 8/2006 | Lee et al. |
| 7,104,757 B2 | 9/2006 | Gross |
| 7,128,533 B2 | 10/2006 | Liang |
| 7,137,781 B2 | 11/2006 | Harvey et al. |
| 7,186,084 B2 | 3/2007 | Bunker et al. |
| 7,195,458 B2 | 3/2007 | Liang |
| 7,300,242 B2 | 11/2007 | Liang |
| 7,399,160 B2 | 7/2008 | Harvey et al. |
| 7,413,407 B2 | 8/2008 | Liang |
| 7,445,432 B2 | 11/2008 | Levine et al. |
| 7,520,723 B2 | 4/2009 | Liang |
| 7,534,089 B2 | 5/2009 | Liang |
| 7,547,191 B2 | 6/2009 | Liang |
| 7,553,534 B2 | 6/2009 | Bunker |
| 7,637,720 B1 * | 12/2009 | Liang .................. F01D 5/187 416/96 R |
| 7,665,965 B1 | 2/2010 | Liang |
| 7,690,892 B1 | 4/2010 | Liang |
| 7,699,583 B2 | 4/2010 | Cunha |
| 7,713,026 B1 | 5/2010 | Liang |
| 7,722,327 B1 | 5/2010 | Liang |
| 7,766,616 B2 | 8/2010 | Baldauf et al. |
| 7,806,658 B2 | 10/2010 | Liang et al. |
| 7,824,156 B2 | 11/2010 | Dellmann et al. |
| 7,866,948 B1 | 1/2011 | Liang |
| 7,938,624 B2 | 5/2011 | Tibbott |
| 7,985,050 B1 | 7/2011 | Liang |
| 8,052,390 B1 | 11/2011 | Liang |
| 8,066,484 B1 | 11/2011 | Liang |
| 8,186,942 B2 | 5/2012 | Haas |
| 8,408,872 B2 | 4/2013 | Briggs et al. |
| 8,672,613 B2 | 3/2014 | Bunker |
| 2005/0042074 A1 | 2/2005 | Liang |
| 2005/0084371 A1 | 4/2005 | Fried et al. |
| 2006/0073011 A1 | 4/2006 | Lee et al. |
| 2006/0099073 A1 | 5/2006 | Djeridane et al. |
| 2007/0128029 A1 | 6/2007 | Liang |
| 2007/0297916 A1 | 12/2007 | Levine et al. |
| 2007/0297917 A1 | 12/2007 | Levine et al. |
| 2008/0164013 A1 | 7/2008 | Maziers |
| 2008/0267784 A1 | 10/2008 | Bolms et al. |
| 2009/0087312 A1 * | 4/2009 | Bunker .................. F01D 5/187 416/95 |
| 2009/0145581 A1 | 6/2009 | Hoffman et al. |
| 2010/0040480 A1 | 2/2010 | Webster et al. |
| 2010/0143153 A1 | 6/2010 | Gross |
| 2010/0221121 A1 | 9/2010 | Liang |
| 2010/0226761 A1 | 9/2010 | Liang |
| 2010/0226791 A1 | 9/2010 | Fujimura et al. |
| 2010/0247328 A1 | 9/2010 | Cunha |
| 2010/0303635 A1 | 12/2010 | Townes et al. |
| 2011/0008155 A1 * | 1/2011 | Hillier .................. F01D 5/18 415/177 |
| 2011/0038709 A1 | 2/2011 | Liang et al. |
| 2011/0164960 A1 | 7/2011 | Maldonado |
| 2012/0070306 A1 | 3/2012 | Lee et al. |
| 2012/0324897 A1 | 12/2012 | McMahan et al. |
| 2013/0089434 A1 | 4/2013 | Simpson et al. |
| 2013/0205790 A1 | 8/2013 | Xu et al. |
| 2013/0209228 A1 | 8/2013 | Xu |
| 2013/0209229 A1 | 8/2013 | Xu et al. |
| 2014/0219814 A1 | 8/2014 | Heselhaus |

(56) References Cited

U.S. PATENT DOCUMENTS

FOREIGN PATENT DOCUMENTS

| | | | | |
|---|---|---|---|---|
| EP | 0845580 | A2 | 6/1998 | |
| EP | 0939196 | A2 | 9/1999 | |
| EP | 0939196 | A2 * | 9/1999 | ............ F01D 5/187 |
| EP | 0945595 | A2 | 9/1999 | |
| EP | 0945595 | A2 * | 9/1999 | ............ F01D 5/187 |
| EP | 1118747 | A2 | 7/2001 | |
| EP | 1655453 | A1 | 5/2006 | |
| EP | 1882818 | A1 | 1/2008 | |
| EP | 1921268 | A1 | 5/2008 | |
| EP | 1975372 | A1 | 10/2008 | |
| EP | 2107215 | A1 | 10/2009 | |
| GB | 2262314 | A | 6/1993 | |
| GB | 2358226 | A | 7/2001 | |
| JP | 08505921 | A | 6/1996 | |
| JP | 08338202 | A | 12/1996 | |
| JP | 3040590 | B2 | 5/2000 | |
| JP | 3124109 | B2 | 1/2001 | |
| JP | 3182602 | B2 | 7/2001 | |
| JP | 3586637 | B2 | 11/2004 | |
| JP | 2006105141 | A | 4/2006 | |
| JP | 2008506061 | A | 2/2008 | |
| WO | 2014055259 | A1 | 4/2014 | |

OTHER PUBLICATIONS

European Search Report and Opinion issued in connection with related EP Application No. 15192372.9 dated Mar. 4, 2016.
European Search Report and Opinion issued in connection with related EP Application No. 15192458.6 dated Mar. 8, 2016.
PCT Search Report and Written Opinion issued in connection with related PCT Application No. PCT/US2015/057718 dated Jun. 16, 2016.
Canadian Office Action issued in connection with related CA Application No. 2910691 dated Nov. 28, 2016.
GE Related Case Form.
Great Britain Search Report and Opinion issued in connection with related GB Application No. 1015936.6 dated Jan. 14, 2011.
U.S. Non-Final Office Action issued in connection with Related U.S. Appl. No. 12/618,241 dated Aug. 10, 2012.
Unofficial English Translation of Japanese Office Action issued in connection with related JP Application No. 2010208729 dated Jun. 3, 2014.
Unofficial English Translation of Japanese Notice of Allowance issued in connection with related JP Application No. 2010208729 dated Jul. 22, 2014.
Great Britain Office Action issued in connection with related GB Application No. 1015936.6 dated May 28, 2015.
Great Britain Office Action issued in connection with related GB Application No. 1015936.6 dated Aug. 11, 2015.
Canadian Office Action issued in connection with Related CA Application No. 2714543 dated Jun. 29, 2016.
Briggs, R., et al., Fastback Turbulator Structure and Turbine Nozzle Incorporating same, GE U.S. Appl. No. 61/245,649, filed Sep. 24, 2009.
Stover, C. W., et al., Fastback Vorticor Pin, GE U.S. Appl. No. 62/004,708, filed May 29, 2014.
Feldmann, K. R., et al., Dust Holes, GE U.S. Appl. No. 62/004,717, filed May 29, 2014.
Bunker, R. S. and Briggs, R. D., Angled Fastback Turbulator, GE U.S. Appl. No. 62/004,682, filed May 29, 2014.
Bunker, R. S., Angled Fastback Turbulator, GE U.S. Appl. No. 62/004,689, filed May 29, 2014.
Bunker, R. S., Angled Fastback Turbulator, GE U.S. Appl. No. 62/004,677, filed May 29, 2014.
Briggs, R. D., et al., Shroud Assembly For A Turbine Engine, GE U.S. Appl. No. 62/073,539, filed Oct. 31, 2014.
Bunker, R. S., et al., Airfoil For A Turbine Engine, GE U.S. Appl. No. 62/073,547, filed Oct. 31, 2014.
Bunker, R. S., Separator Assembly For A Gas Turbine Engine, GE U.S. Appl. No. 62/073,455, filed Oct. 31, 2014.
Bunker, R. S. and Stone, T. D., Engine Component For A Gas Turbine Engine, GE U.S. Appl. No. 62/073,429, filed Oct. 31, 2014.
Bunker, R. S., Engine Component For A Gas Turbine Engine, GE Pending U.S. Appl. No. 62/073,388, filed Oct. 31, 2014.
PCT Search Report issued in connection with corresponding Application No. PCT/US2015/033240 dated May 29, 2014.
Office Action issued in connection with corresponding CA Application No. 2950011 dated Jul. 30, 2018.

* cited by examiner

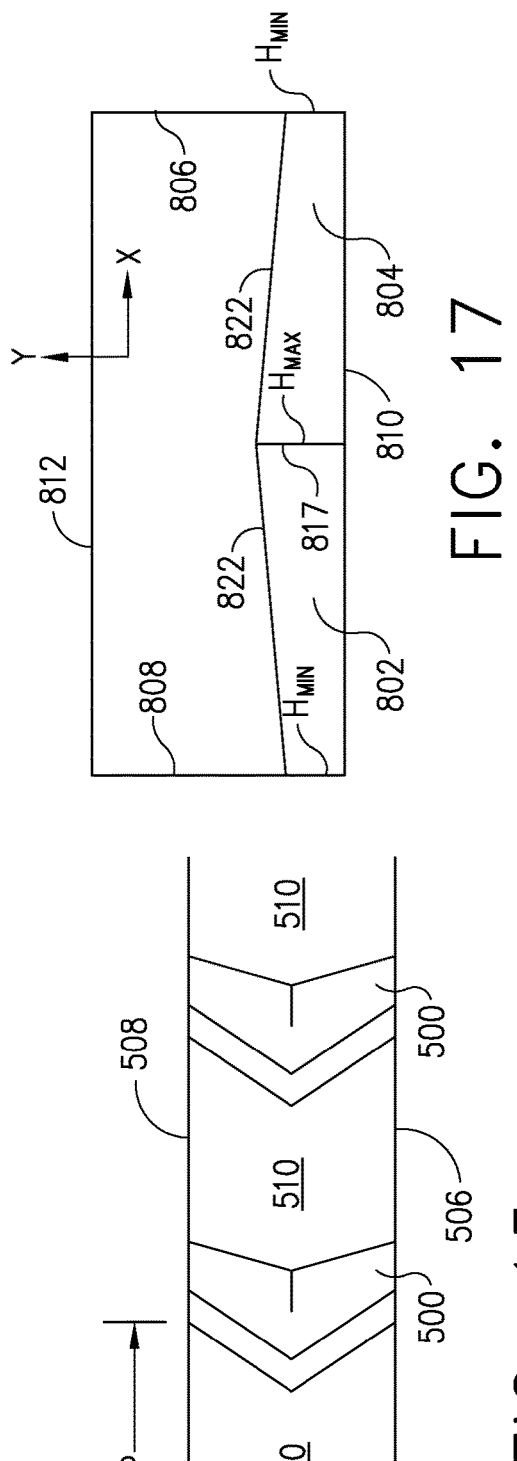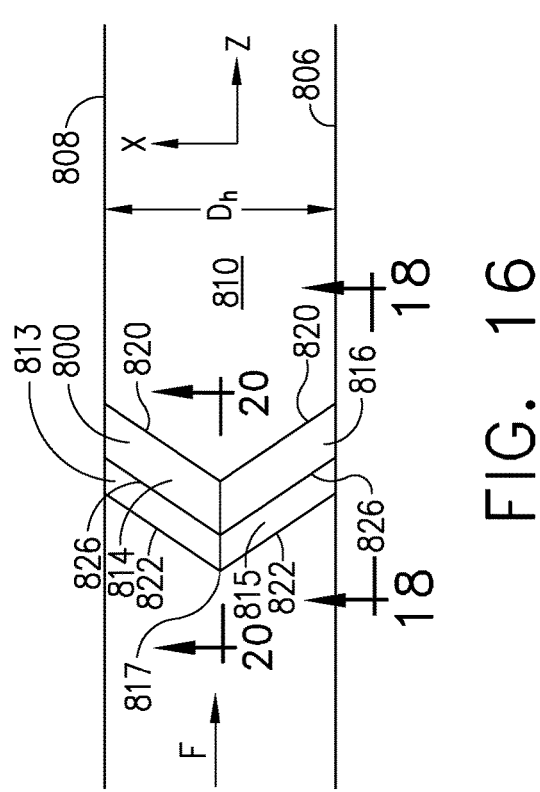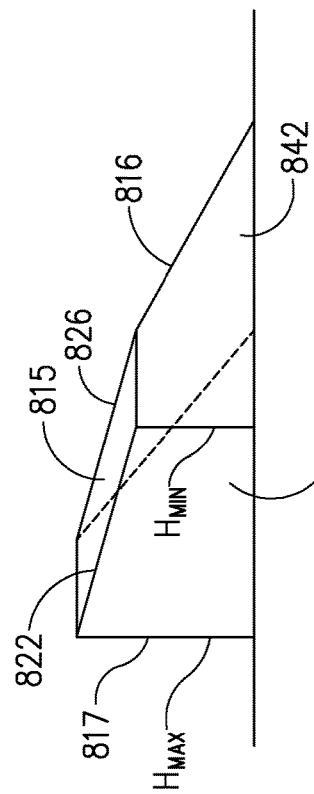

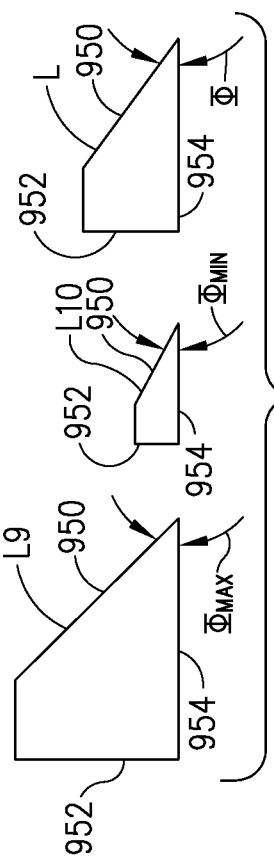
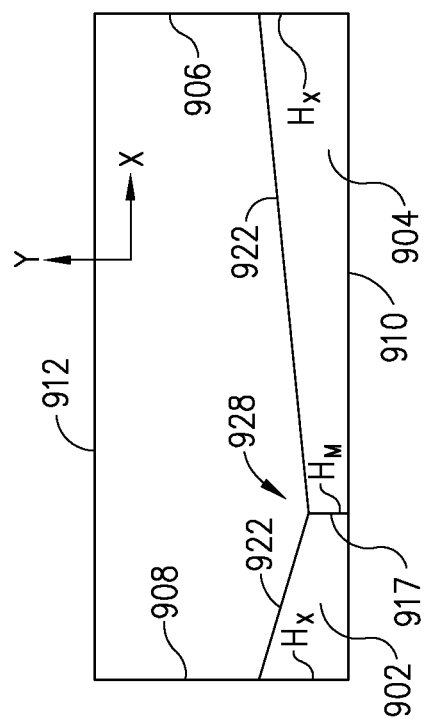
FIG. 23
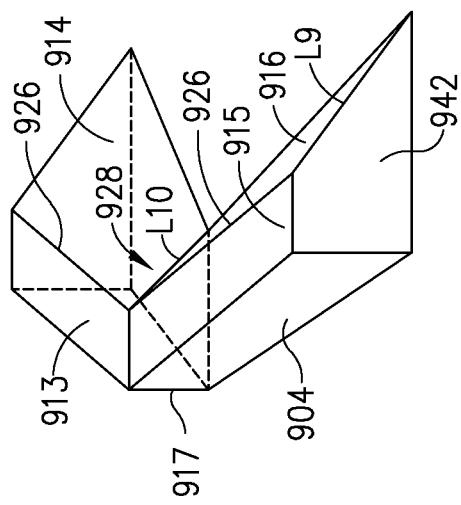
FIG. 24
FIG. 25

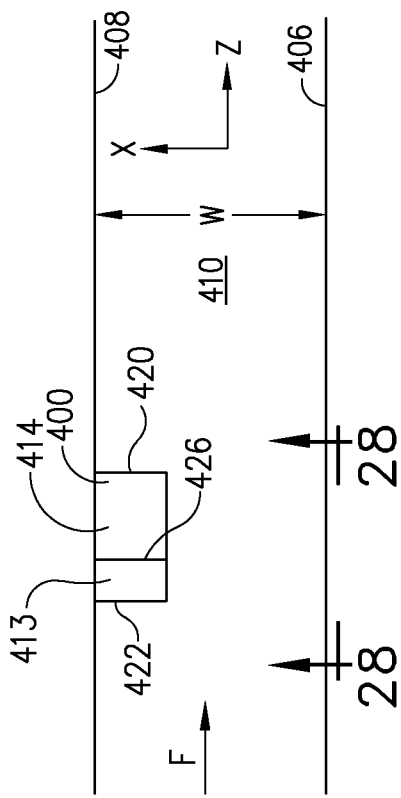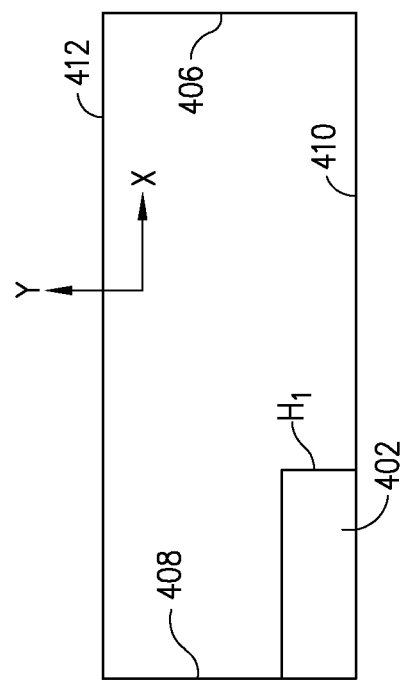

FASTBACK TURBULATOR

BACKGROUND

This disclosure relates generally to heat transfer in gas turbine engines and more particularly to apparatus for cooling structures in such engines.

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. The combustor and HPT components operate in an extremely high temperature environment, and must be cooled by air flow to ensure adequate service life.

Cooling air flow is typically provided by utilizing relatively lower-temperature "bleed" air extracted from an upstream part of the engine, for example the high pressure compressor, and then feeding that bleed air to high-temperature downstream components. The bleed air may be applied in numerous ways, for example through internal convection cooling or through film cooling or both. Preexisting usage of bleed air and other cooling air flows the air over rib rougheners, trip strips, and pin fins. When used for convection cooling, the bleed air is often routed through serpentine passages or other structures which generate a pressure loss as the cooling air passes through them. Because bleed air represents a loss to the engine cycle and reduces efficiency, it is desired to maximize heat transfer rates and thereby use the minimum amount of cooling flow possible. For this reason heat transfer improvement structures, such as pin fins or turbulators may be on cooled subsurfaces.

Conventional turbulators are elongated strips or ribs having a square, rectangular, or other symmetric cross-section, and are generally aligned transverse to the direction of flow. The turbulators serve to "trip" the boundary layer across the entire width of a flow passage at the component subsurface and create turbulence which increases heat transfer. Cooling effectiveness is thereby increased. One problem with the use of conventional turbulators is that a flow stagnation zone is present downstream of each turbulator. This zone causes dust, which is naturally entrained in the cooling air, to be deposited and build up behind the turbulator. This build-up is an insulating layer which reduces heat transfer also can cause undesirable wear.

An example of a particular gas turbine engine structure requiring effective cooling is an HPT blade. HPT blades are configured as an array or stage of airfoils connected to, or an integral part of, the HPT rotor and located within the hot gas path annular flow region immediately after the combustor exit HPT nozzle. The HPT blades operate within extremely high gas temperatures while also experiencing high rotational loads and mechanical stresses. These blades are conventionally cooled by one or more mechanisms such as internal cooling passages with turbulators, cooling cavities with arrays of pin fins, impingement jet cooling, and film cooling. Within the very complex cooling passages and features contained in them, there exist many locations where the cooling flow experiences separation and recirculation zones. For example, the regions immediately following each conventional turbulator experience such flow recirculations to varying degrees. As a consequence, particulates carried with the flow have a longer residence time in these regions and may have a higher probability of accumulating and depositing on the cooled surfaces leading to increased undesirable thermal resistance. It is therefore desirable to incorporate alternate geometries of turbulators that can alleviate or minimize these flow recirculation and stagnation regions.

BRIEF SUMMARY

A structure for disrupting the flow of a fluid, the structure comprising: (a) a first lateral wall and a second lateral wall spaced apart from one another a distance across an X-axis; and, (b) a turbulator extending between the first lateral wall and the second lateral wall, the turbulator extending away from the floor, the turbulator comprising: (i) a first front surface extending between the first lateral wall and the second lateral wall, the first front surface extending from the floor and being transverse with respect to a Z-axis extending longitudinally along the floor, (ii) a second front surface extending between the first lateral wall and the second lateral wall, the second front surface extending from the floor and being transverse with respect to the Z-axis, the second front surface not in parallel with the first front surface, (iii) a first rear surface extending between the first lateral wall and the second lateral wall, the first rear surface extending between the first front surface and the floor, the first rear surface having an inclining section that is angled between ninety and ten degrees with respect to a Y-axis extending perpendicular to the floor, the Y-axis being perpendicular to the Z-axis, and (iv) a second rear surface adjoining the first rear surface and extending between the first lateral wall and the second lateral wall, the second rear surface extending between the second front surface and the floor, the second rear surface having an inclining section that is angled between ninety and ten degrees with respect to the Y-axis, where the X-axis is perpendicular to both the Y-axis and the Z-axis.

BRIEF DESCRIPTION OF THE DRAWINGS

The disclosure may be best understood by reference to the following description taken in conjunction with the accompanying drawing figures in which:

FIG. 15 is top view a series of the exemplary embodiments of FIG. 8 distributed within a cooling channel.

FIG. 16 is a top view of a third exemplary embodiment of a turbulator in accordance with the instant disclosure.

FIG. 17 is a front view of the fifth exemplary embodiment of FIG. 16.

FIG. 18 is a right profile view of the fifth exemplary embodiment of FIG. 16.

FIG. 23 is a front view of the sixth exemplary embodiment of FIG. 22.

FIG. 24 is an elevated perspective view from the front right corner of the sixth exemplary embodiment of FIG. 22.

FIG. 25 is a series of triangular cross-sections of the exemplary embodiment of FIG. 2 showing relationships between height, length, and angle φ.

FIG. 26 is a top view of a first exemplary embodiment of a partial span corner turbulator in accordance with the instant disclosure.

FIG. 27 is a front view of the first exemplary embodiment of FIG. 26.

DETAILED DESCRIPTION

Figure 2:
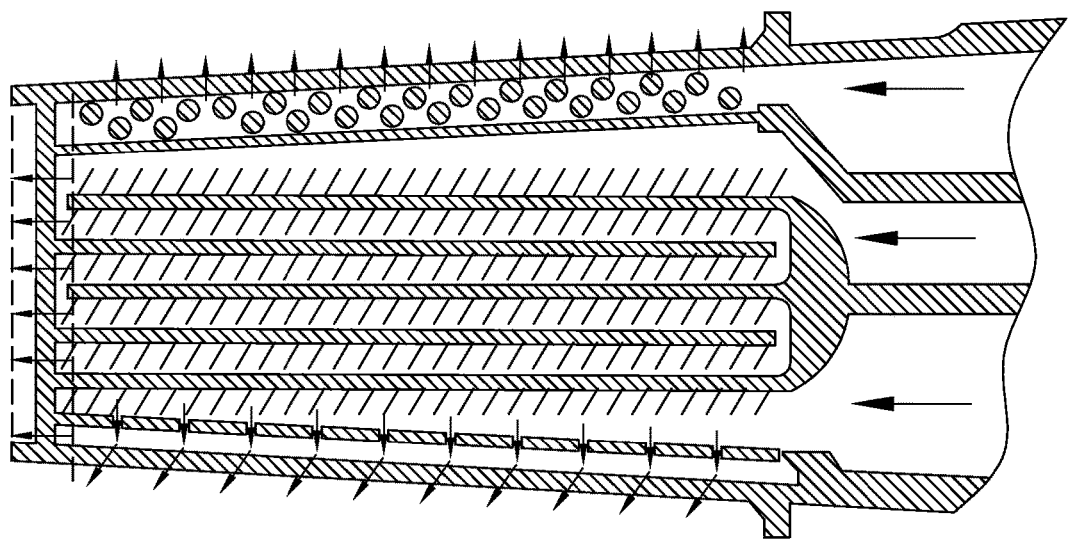
FIG. 2 is a cross-sectional view of a prior art blade showing cooling channels.

The exemplary embodiments of the present disclosure are described and illustrated below to encompass methods and devices for creating and maintaining turbulent fluid flow. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

It is a first aspect of the present disclosure to provide a structure for disrupting the flow of a fluid, the structure comprising: (a) a first lateral wall and a second lateral wall spaced apart from one another a distance across an X-axis; (b) a turbulator extending between the first lateral wall and the second lateral wall, the turbulator extending away from the floor, the turbulator comprising: (i) a first front surface extending between the first lateral wall and the second lateral wall, the first front surface extending from the floor and being transverse with respect to a Z-axis extending longitudinally along the floor, (ii) a second front surface extending between the first lateral wall and the second lateral wall, the second front surface extending from the floor and being transverse with respect to the Z-axis, the second front surface not in parallel with the first front surface, (iii) a first rear surface extending between the first lateral wall and the second lateral wall, the first rear surface extending between the first front surface and the floor, the first rear surface having an inclining section that is angled between ninety and ten degrees with respect to a Y-axis extending perpendicular to the floor, the Y-axis being perpendicular to the Z-axis, and (iv) a second rear surface adjoining the first rear surface and extending between the first lateral wall and the second lateral wall, the second rear surface extending between the second front surface and the floor, the second rear surface having an inclining section that is angled between ninety and ten degrees with respect to the Y-axis, where the X-axis is perpendicular to both the Y-axis and the Z-axis.

In a more detailed embodiment of the first aspect, the first front surface is obliquely angled with respect to the Z-axis. In yet another more detailed embodiment, the first front surface is angled between eighty-five and fifteen degrees with respect to the Z-axis. In a further detailed embodiment, the first front surface is angled between seventy-five and twenty-five degrees with respect to the Z-axis. In still a further detailed embodiment, the first front surface is angled between sixty-five five and thirty-five degrees with respect to the Z-axis. In a more detailed embodiment, the first front surface is angled between fifty-five five and forty-five degrees with respect to the Z-axis. In a more detailed embodiment, the second front surface and first front surface extend completely between the first lateral wall and the second lateral wall. In another more detailed embodiment, the second front surface is obliquely angled with respect to the Z-axis. In yet another more detailed embodiment, the second front surface is angled between eighty-five and fifteen degrees with respect to the Z-axis. In still another more detailed embodiment, the second front surface is angled between seventy-five and twenty-five degrees with respect to the Z-axis.

In yet another more detailed embodiment of the first aspect, the second front surface is angled between sixty-five five and thirty-five degrees with respect to the Z-axis. In yet another more detailed embodiment, the second front surface is angled between fifty-five five and forty-five degrees with respect to the Z-axis. In a further detailed embodiment, at least one of the first front surface and the second front surface has a height coaxial with the Y-axis that is uniform across the X-axis. In still a further detailed embodiment, the first front surface has a first height coaxial with the Y-axis that is uniform across the X-axis, and the second front surface has a second height coaxial with the Y-axis that is uniform across the X-axis. In a more detailed embodiment, at least one of the first front surface and the second front surface has a height coaxial with the Y-axis that is nonuniform across the X-axis. In a more detailed embodiment, the first front surface has a first nonuniform height coaxial with the Y-axis across the X-axis, and the second front surface has a second nonuniform height coaxial with the Y-axis across the X-axis. In another more detailed embodiment, the first front surface and the second front surface are oriented in a chevron orientation. In yet another more detailed embodiment, the first rear surface is obliquely angled with respect to the Z-axis. In still another more detailed embodiment, the first rear surface is angled between eighty-five and fifteen degrees with respect to the Y-axis.

In a more detailed embodiment of the first aspect, the first rear surface is angled between seventy-five and twenty-five degrees with respect to the Y-axis. In yet another more detailed embodiment, the first rear surface is angled between sixty-five five and thirty-five degrees with respect to the Y-axis. In a further detailed embodiment, the first rear surface is angled between fifty-five five and forty-five degrees with respect to the Y-axis. In still a further detailed embodiment, the second rear surface is obliquely angled with respect to the Y-axis. In a more detailed embodiment, the second rear surface is obliquely angled with respect to the Y-axis. In a more detailed embodiment, the second rear surface is angled between eighty-five and fifteen degrees with respect to the Y-axis. In another more detailed embodiment, the second rear surface is angled between seventy-five and twenty-five degrees with respect to the Y-axis.

In a more detailed embodiment of the first aspect, the second rear surface is angled between sixty-five five and thirty-five degrees with respect to the Y-axis. In yet another more detailed embodiment, the second rear surface is angled between fifty-five five and forty-five degrees with respect to the Y-axis. In a further detailed embodiment, at least one of the first rear surface and the second rear surface has a uniform slope across the X-axis. In still a further detailed embodiment, the first rear surface has a first uniform slope across the X-axis, and the second rear surface has a second uniform slope across the X-axis. In a more detailed embodiment, at least one of the first rear surface and the second rear surface has a slope that is nonuniform across the X-axis. In a more detailed embodiment, the first rear surface has a first nonuniform slope across the X-axis, and the second rear surface has a second nonuniform slope across the X-axis. In another more detailed embodiment, at least one of the first rear surface and the second rear surface has a uniform length across the X-axis. In yet another more detailed embodiment, the first rear surface has a first uniform length across the X-axis, and the second rear surface has a second uniform length across the X-axis. In still another more detailed embodiment, at least one of the first rear surface and the second rear surface has a length that is nonuniform across the X-axis.

In yet another more detailed embodiment of the first aspect, the first rear surface has a first nonuniform length across the X-axis, and the second rear surface has a second nonuniform length across the X-axis. In yet another more detailed embodiment, the first rear surface and the second rear surface are oriented in a chevron orientation. In a further detailed embodiment, the second front surface adjoins the first front surface. In still a further detailed embodiment, the second rear surface adjoins the first rear surface. In a more detailed embodiment, an intermediary surface interposes and operatively couples at least the first front surface to the second front surface and the first rear surface to the second rear surface. In a more detailed embodiment, the first front surface and second front surface cooperate to extend completely between the first lateral wall and the second lateral wall. In another more detailed embodiment, the first rear surface and second rear surface cooperate to extend completely between the first lateral wall and the second lateral wall. In yet another more detailed embodiment, the first front surface and the second front surface are joined proximate a midline between the first lateral wall and the second lateral wall. In still another more detailed embodiment, the first front surface and the second front surface are joined at a location more than 1.25 times as close to the first lateral wall as to the second lateral wall.

In a more detailed embodiment of the first aspect, the first rear surface and the second rear surface are joined proximate a midline between the first lateral wall and the second lateral wall. In yet another more detailed embodiment, the first rear surface and the second rear surface are joined at a location more than 1.25 times as close to the first lateral wall as to the second lateral wall. In a further detailed embodiment, the turbulator comprises a plurality of turbulators. In still a further detailed embodiment, the plurality of turbulators are oriented in series along the Z-axis. In a more detailed embodiment, the plurality of turbulators are uniformly spaced apart from one another. In a more detailed embodiment, the plurality of turbulators are nonuniformly spaced apart from one another.

Figure 1:
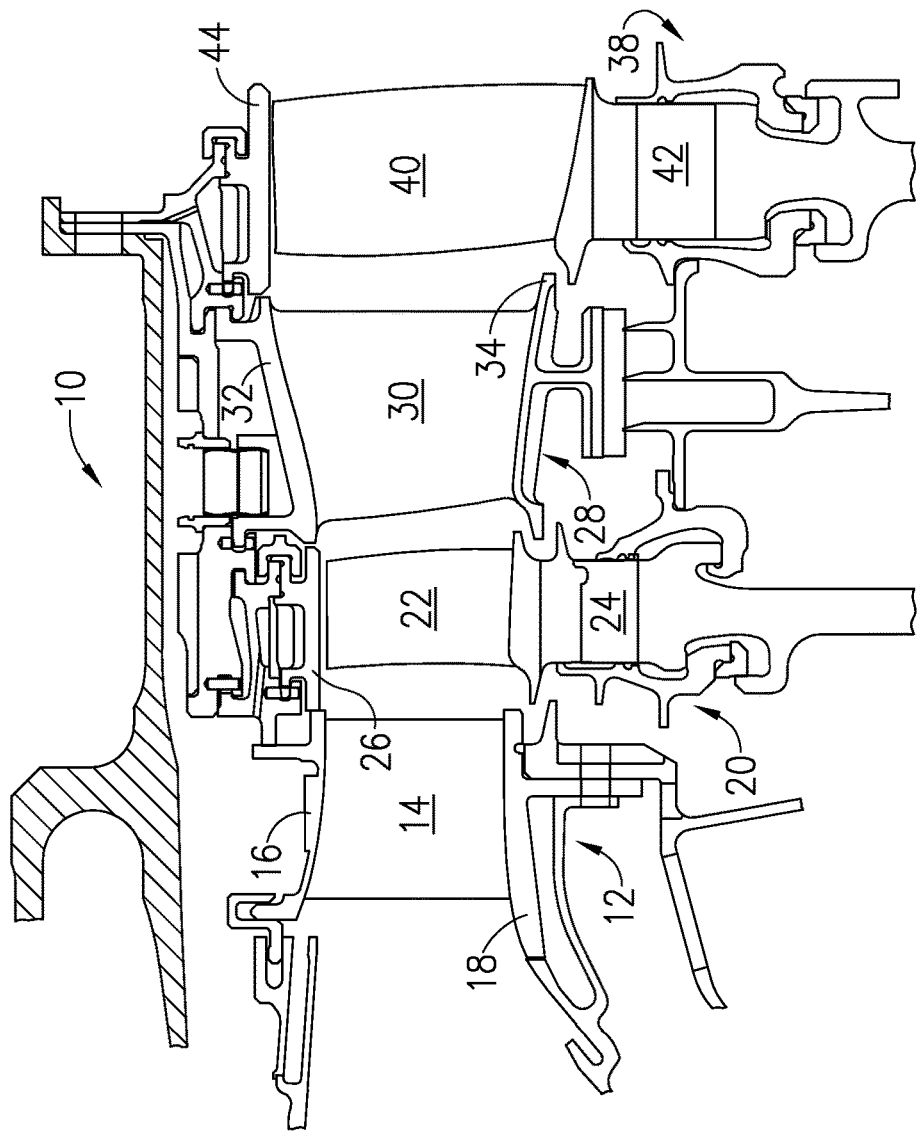
FIG. 1 is a cross-sectional view of a high pressure turbine section of a gas turbine engine.

Referring to FIG. 1, an exemplary gas turbine engine includes a high pressure turbine section 10 downstream from a combustor section (not shown). The function of the high pressure turbine section 10 is to convert kinetic energy from high-temperature, pressurized combustion gases arriving from the upstream combustor into mechanical energy in the form of mechanical work. Those skilled in the art are knowledgeable with the general component of a gas turbine engine and, accordingly, a detailed explanation of each section preceding the high pressure turbine section 10 has been omitted in furtherance of brevity.

The high pressure turbine section 10 includes a first stage nozzle 12 comprising a plurality of circumferentially distributed and spaced apart first stage vanes 14 that are supported between outer and inner bands 16, 18. In exemplary form, the first stage nozzle 12 comprises a plurality of nozzle segments mounted with respect to one another to collectively form a complete 360° assembly, where each nozzle segment includes a pair of first stage vanes 14, an outer band segment 16, and an inner band segment 18. The first stage outer and inner bands 16, 18 and vanes define an enclosed pathway directing the combustion gases to a first stage rotor 20.

The first stage rotor section 20 includes a series of first stage turbine blades 22 extending from a first stage disk 24. A segmented first stage shroud 26 is arranged to surround the first stage turbine blades 22. As the hot combustion gases pass over the turbine blades 22, the energy of the combustion gases is partially converted into mechanical energy by rotating the blades 22 and disk 24 around a central axis. After passing over the blades 22, the combustion gases enter a second stage nozzle section 28.

The second stage nozzle section 28 comprises a plurality of circumferentially spaced hollow second stage vanes 30 that are supported between a second stage outer band 32 and a second stage inner band 34. In exemplary form, the second stage nozzle section 28 comprises a plurality of nozzle segments mounted with respect to one another to collectively form a complete 360° assembly, where each nozzle segment includes a pair of second stage vanes 30, a second stage outer band segment 32, and second stage inner band segment 34. The second stage outer and inner bands 32 and 34 cooperate with the second stage vanes 30 to demarcate combustion gases flowpath boundaries upon receiving the combustion gases from the first stage rotor 20, which after flowing through the second stage nozzle section 28 continues on to the second stage rotor section 38. It should be noted that the foregoing is an example only. Other designs exist for example, where the segments are not each of two nozzles.

The second stage rotor section 38 includes a radial array of second stage turbine blades 40 extending from a second stage disk 42. A segmented second stage shroud 44 is arranged to surround the second stage turbine blades 40. As the combustion gases pass over the turbine blades 40, the energy of the combustion gases is partially converted into mechanical energy by rotating the blades 40 and disk 42 around a central axis.

Given the extreme temperatures that the components of the high pressure turbine section 10 are subjected to, cooling many of these components becomes advantageous to increase component longevity. In order to cool the components, several approaches have been utilized, including providing for cooling fluid passages through the components. In the case of the first and second stage nozzle sections 12, 28, cooling fluid flows through passages that extend through the outer and inner bands 16, 18, 32, 34, into interior cavities in the vanes 14, 30, where the cooling fluid egresses through a plurality of orifices on the exterior of the vanes. Similarly, in the case of the first and second stage rotor sections 20, 38, cooling fluid flows through passages that extend into interior cavities in the blades 22, 40, where the cooling fluid egresses through a plurality of orifices on the exterior of the blades.

In order to maximize the convective heat transfer from the components of the high pressure turbine section 10 to the cooling fluid, the cooling fluid should be turbulent and boundary layers between the high pressure turbine section 10 components and the cooling fluid should be minimized. Stagnant or recirculating flows do not provide the turbulent mixing of the flow that serves to refresh cooling fluid at the component surface and minimize boundary layer growth. Such flow zones also result in lower heat transfer coefficients between the fluid and surfaces. Stagnant and recirculating flows with entrained particulates will have a higher probability of accumulating layers of particulates that act as increased thermal resistance and again may lower effective cooling.

As used herein, "turbulator" refers to a structure utilized to promote turbulent flow within a cooling channel, where the cooling channel is generally demarcated by opposing walls that are joined by a floor and/or a ceiling, so that the turbulator extends between opposing walls. Turbulators serve to "trip" the cooling fluid flowing through the cooling channel to create eddies as part of creating and maintaining turbulent fluid flow. Turbulent flow proximate the high pressure turbine section 10 component surface increases the rate of convective heat transfer from the components to the cooling fluid.

One or more turbulators may be associated with any of the components of the high pressure turbine section 10 including, without limitation, vanes, blades, bands, and shrouds. By way of example, FIG. 2 shows an internal cross-section of a prior art blade having a series of cooling channels distributed therethrough. Similar channels can be found in other vanes, bands, and shrouds, which are known to those skilled in the art and need not be discussed in great detail.

Exemplary turbulators in accordance with the instant disclosure may exhibit various geometries, but all turbulators have in common an upright front surface that generally faces the direction of cooling airflow F, and a back surface that defines a ramp-like shape inclining/declining from the front surface toward a ceiling or floor.

As shown specifically in FIGS. 3-6, a first exemplary chevron turbulator 400 includes a pair of front surfaces 402, 404, a pair of top surfaces 413, 415, and a pair of rear surfaces 414, 416, all extending above a floor 410. For purposes of explanation only, a coordinate system is established as part of describing the features of the exemplary turbulator 400, where a Y-axis extends perpendicularly from the floor 410, an X-axis extends perpendicularly from Y-axis in the lateral or widthwise direction W, and a Z-axis extends perpendicularly from the X-axis and the Y-axis parallel to the bulk average direction of fluid flow F. The front surfaces 402, 404 surface and are transverse to the direction of airflow F (and the Z-axis) and may be angled±between zero and sixty degrees with respect to the X-axis. By way of example, the accompanying drawings depict the front surfaces 402, 404 as being angled±forty-five degrees with respect to the X-axis. A vertical apex in the form of a vertical edge 417 extends vertically in the Y-direction where the front surfaces 402, 404 meet one another, which is equidistant between the opposed lateral walls 406, 408.

The front surfaces 402, 404 may also be angled with respect to the Y-axis. Specifically, the front surfaces 402, 404 may be angled±between zero and forty-five degrees with respect to the Y-axis. By way of example, the accompanying drawings depict the front surfaces 402, 404 as being angled±zero degrees with respect to the Y-axis.

The front surfaces 402, 404 each include a substantially constant height (extending in the Y-direction) and cooperate to extend between opposing lateral, vertical walls 406, 408 that extend along the Y and Z axes. These walls 406, 408 are bridged by the floor 410 and a ceiling 412, both of which extend along the X and Z axes. In exemplary form, the floor 410 comprises a planar surface, whereas the walls 406, 408 also embody planar surfaces that each extends perpendicular to the floor. It should be noted, however, that the opposing walls 406, 408 need not be planar, nor angled perpendicularly with respect to the floor 410. Likewise, it should be understood that the floor 410 need not be planar or angled perpendicularly with respect to either or both of the lateral walls 406, 408.

The top surfaces 413, 415 extend along the X and Z axes and may be planar and angled approximately ninety degrees with respect to the front surfaces 402, 404 (and Y axis). In exemplary form, the top surfaces 413, 415 are parallel to the floor 410 and have a generally four-sided shape with opposing lateral sides delineating the depth in the Z-direction, which is approximately equal to the height of the front surfaces 402, 404. In this exemplary embodiment, the lateral sides are equidistant, as are the forward and rear sides that establish the depth of the top surfaces 413, 415, thereby delineating a quadrilateral shape. By way of example, the top surfaces may have a length in the Z-direction ranging from zero to the height of the front surfaces 402, 404. It should be noted, however, that the top surfaces 413, 415 need not embody a quadrilateral shape or for that matter a four sided shape. It should also be noted that the top surfaces 413, 415 may be omitted so that the front surfaces 402, 404 and rear surfaces 414, 416 directly meet one another.

In this exemplary turbulator 400, the rear surfaces 414, 416 completely extend from the floor 410 to a terminal edge 426 (i.e., top edge in the shape of a V) of the top surfaces 413, 415 vertically spaced above the floor. The rear surfaces 414, 416 are inclined at an angle φ with respect to the Z-axis that may be constant or vary across the lateral widthwise dimension W (along the X axis). Said another way, the length of the rear surfaces 414, 416 (between the terminal edge 426 and the line of termination 420 in the Z-axis direction) may be uniform or may be nonuniform across the widthwise dimension W. A sloped trough 428 is formed where the rear surfaces 414, 416 meet one another, which is also equidistant between the opposed lateral walls 406, 408.

Figure 5:
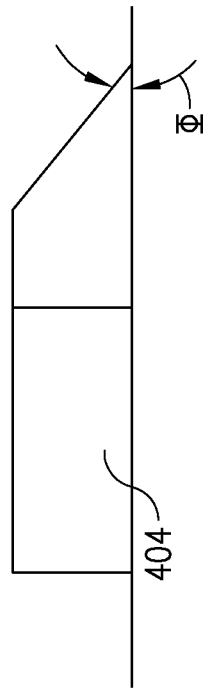
FIG. 5 is a right side profile view of the first exemplary embodiment of FIG. 3.
Figure 6:
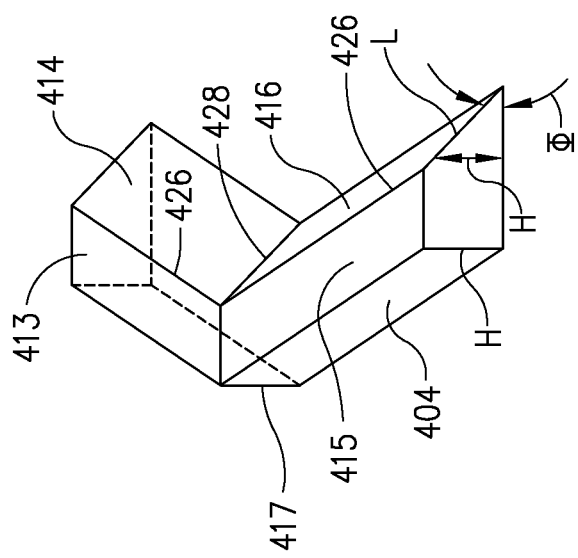
FIG. 6 is an elevated perspective view from the front right corner of the first exemplary embodiment of FIG. 3.
Figure 3:
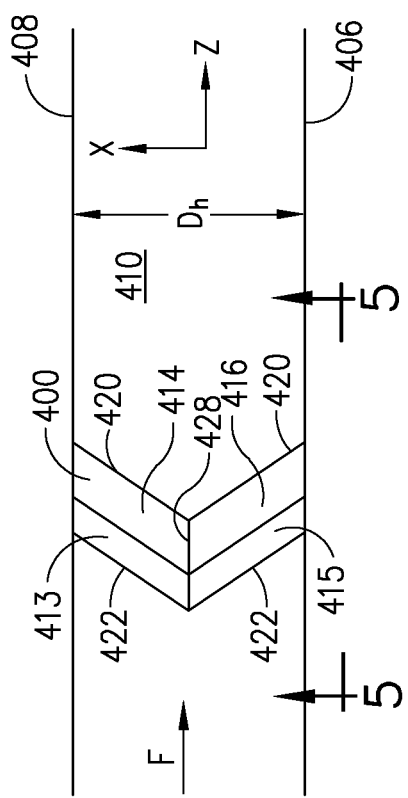
FIG. 3 is a top view of a first exemplary embodiment of a turbulator in accordance with the instant disclosure.
Figure 4:
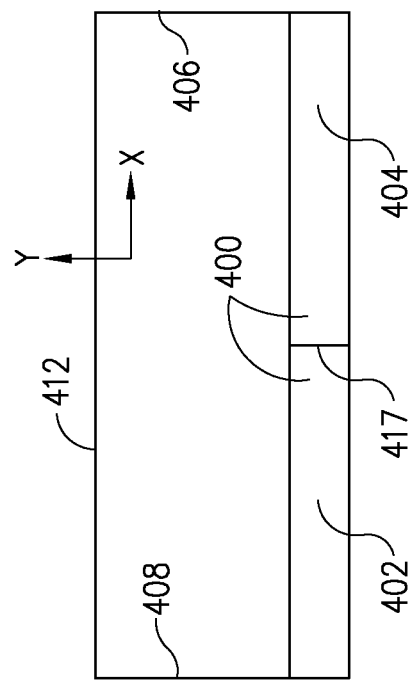
FIG. 4 is a front view of the first exemplary embodiment of FIG. 3.

Referring to FIGS. 5 and 6, the angle φ may be selected to be large enough so that the turbulator 400 has a reasonable overall length in the direction of cooling airflow F, but preferably not so large that a stagnation zone would be present during operation. As an example, the angle φ may average about 45° or less. More specifically, the angle φ may average approximately 30°. For purposes of illustration in the figures only, angle φ is 25 degrees.

This first exemplary turbulator 400 includes rear surfaces 414, 416 with lengths L in the Z-direction that are uniform across the widthwise dimension W (X-axis direction). Those skilled in the art will understand that the lengths of the rear surfaces 414, 416 may vary depending upon the angle φ chosen, and vice versa, depending upon various factors.

Referring back to FIGS. 3-6, in this exemplary turbulator 400, the front surfaces 402, 404 are planar and are angled approximately forty five degrees with respect to the X-axis and ninety degrees with respect to one another. In exemplary form, a line of termination 420 of the rear surfaces 414, 416 extends in a V-shape and is parallel with a line of origination 422 at the base of the front surface 402, 404. In circumstances where angle φ is uniform, such as the instant case, the line of termination 420 may be parallel to the line of inception 422, which likewise evidences a uniform length of the rear surface 414, 416 in the direction of the Z-axis.

In circumstances where particulates are deposited and the surface of the component is intended for convective heat transfer, as introduced previously, these particulates act as insulators and reduce thermal transfer between the flowing fluid and the intended heat transfer surface. In addition to being insulators, particulates also tend to accumulate more in stagnant or recirculating regions. Consequently, the combined effects of particulates within flow fields having stagnant or recirculating flows may lead to a significant reduction in the effective convective thermal transfer. By using one or more turbulators 400, areas of stagnant or recirculating airflow can be significantly reduced.

Figure 7:
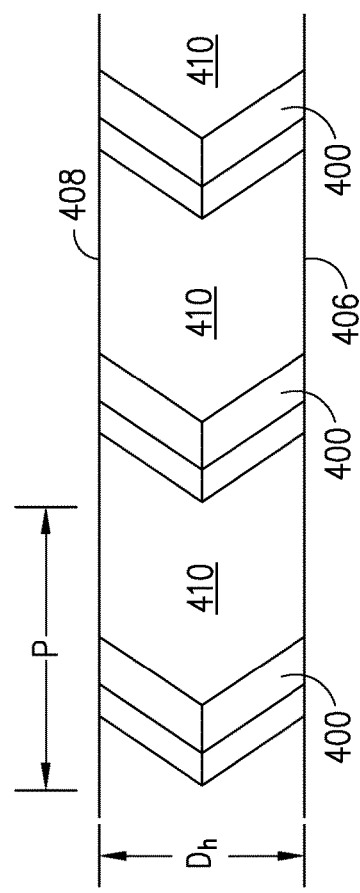
FIG. 7 is top view a series of the exemplary embodiments of FIG. 3 distributed within a cooling channel.
Figure 8:
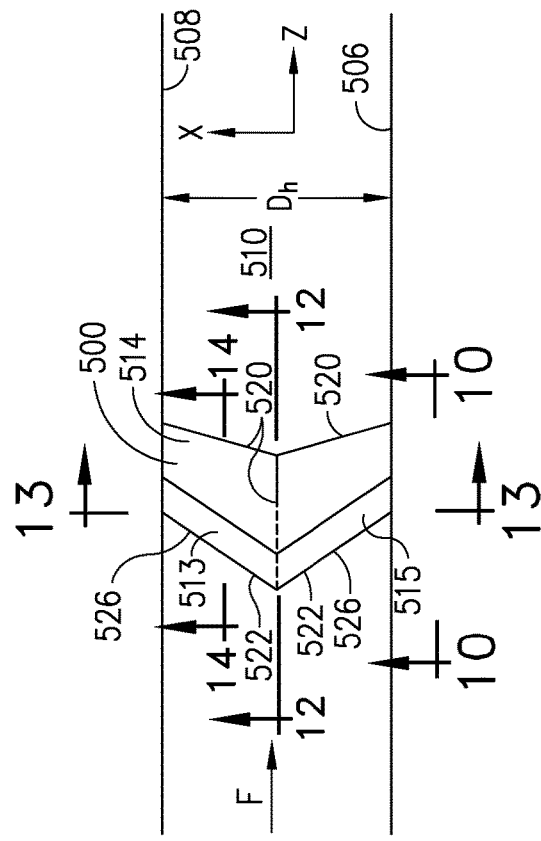
FIG. 8 is a top view of a second exemplary embodiment of a turbulator in accordance with the instant disclosure.
Figure 13:
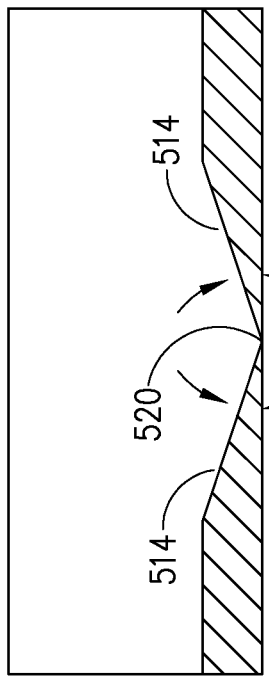
FIG. 13 is a cross-sectional view of the exemplary embodiment of FIG. 8 taken along line 13-13.
Figure 14:
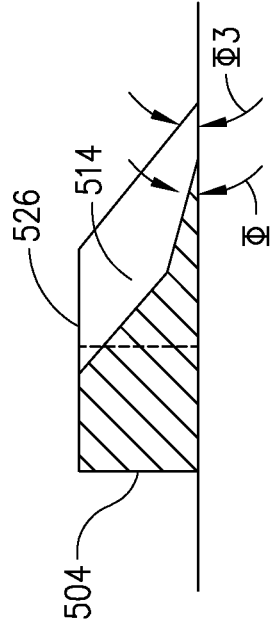
FIG. 14 is a cross-sectional view of the exemplary embodiment of FIG. 8 taken along line 14-14.
Figure 11:
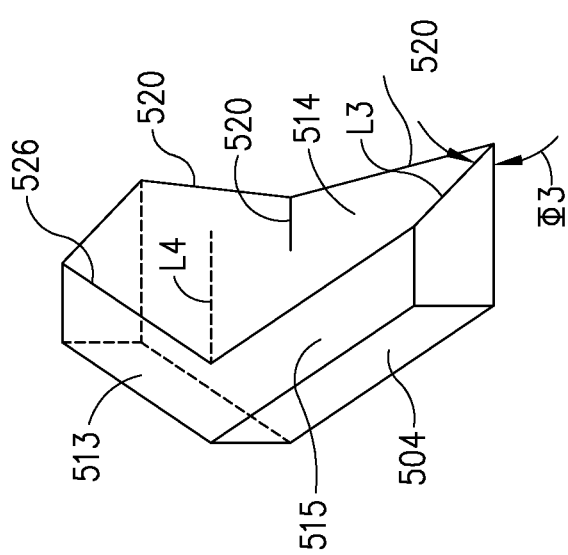
FIG. 11 is an elevated perspective view from the front right corner of the second exemplary embodiment of FIG. 8.
Figure 12:
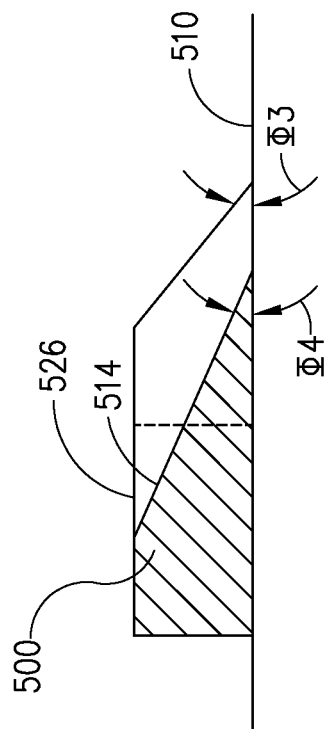
FIG. 12 is a cross-sectional view of the exemplary embodiment of FIG. 8 taken along line 12-12.
Figure 19:
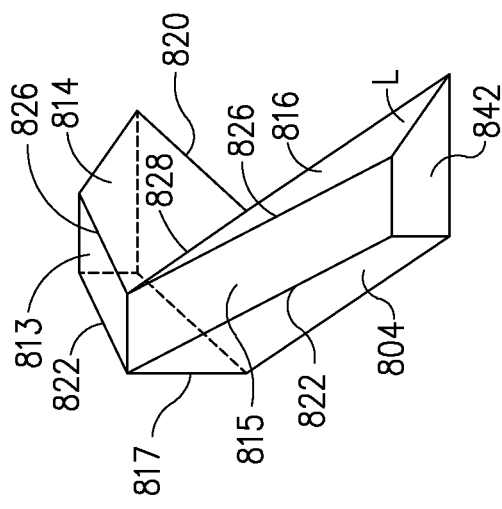
FIG. 19 is an elevated perspective view from the front right corner of the fifth exemplary embodiment of FIG. 16.

For example, as shown in FIG. 7, the turbulator 400 may be repeated to further reduce stagnant airflow. In this exemplary configuration, a series of turbulators 400 are spaced apart in a predetermined configuration. More specifically, the distance of a repeating unit, represented by distance "P," may be predetermined based upon the height of the turbulator 400, represented by distance "H." By way of example, the spacing to height ratio (P/H, etc.) may fall within the following range: $5 \leq (P/H) \leq 20$. Alternatively or in addition, the height H of the turbulator 400 may be predetermined based upon the hydraulic diameter of the cooling channel, represented by distance "Dh." Those skilled in the art are familiar with determining the hydraulic diameter for a channel and a detailed description of determining the hydraulic diameter has been omitted for purposes of brevity. For example, the height to hydraulic diameter ratio ($H_1/Dh$, $H_2/Dh$, etc.) may fall within the following range: $0.02 \leq (H/Dh) \leq 0.25$, and more specifically may fall within the range: $0.05 \leq (H/Dh) \leq 0.15$. In further alternative or addition, the height H of the turbulator 400 may be predetermined based upon the length of the rear surface 414, represented by distance "L" (see FIG. 6). For example, the length to height ratio (L/H, etc.) may fall within the following range: $1.2 \leq (L/H) \leq 6$. It should also be noted, however, that the turbulators 400 may be arranged differently than as shown in FIG. 7.

As shown specifically in FIGS. 8-15, a second exemplary turbulator 500 includes front surfaces 502, 504, top surfaces 513, 515, and a rear surface 514, all extending above a floor 510. For purposes of explanation only, the same coordinate system will be utilized as was described previously for the first exemplary turbulator 400. The front surfaces 502, 504 are transverse to the bulk average direction of airflow F (and the Z-axis) and may be angled±between zero and sixty degrees with respect to the X-axis. By way of example, the accompanying drawings depict the front surfaces 502, 504 as being approximately angled±forty-five degrees with respect to the X-axis. In addition, the front surfaces 502, 504 may not be completely vertical and may be angled greater than zero and up to forty-five degrees with respect to the Y-axis. By way of example, the accompanying drawings depict the front surfaces 502, 504 as being angled zero degrees with respect to the Y-axis.

The front surfaces 502, 504 include a substantially constant height (in the direction of the Y-axis) and extend between opposing lateral, vertical walls 506, 508 that extend along the Y and Z axes. These walls 506, 508 are bridged by the floor 510 and a ceiling 512, both of which extend along the X and Z axes. In exemplary form, the floor 510 comprises a planar surface, whereas the walls 506, 508 also embody planar surfaces that each extends perpendicular to the floor. It should be noted, however, that the opposing walls 506, 508 need not be planar, nor angled perpendicularly with respect to the floor 510. Likewise, it should be understood that the floor 510 need not be planar or angled perpendicularly with respect to either or both of the lateral walls 506, 508.

The top surfaces 513, 515 extend along the X and Z axes and may be planar and angled approximately ninety degrees with respect to the front surfaces 502, 504 (and Y axis). In exemplary form, the top surfaces 513, 515 are parallel to the floor 510 and have a generally four-sided shape with opposing lateral sides delineating the depth in the Z-direction, which is approximately equal to the height of the front surface 502. In this exemplary embodiment, the lateral sides are equidistant, as are the forward and rear sides that establish the depth of the top surfaces 513, 515, thereby delineating a quadrilateral shape. By way of example, the top surfaces may have a length in the Z-direction ranging from zero to the height of the front surfaces 502, 504. It should be noted, however, that the top surfaces 513, 515 need not embody a quadrilateral shape or for that matter a four sided shape. It should also be noted that the top surfaces 513, 515 may be omitted so that the front surfaces 502, 504 and rear surface 514 directly meet one another.

In this exemplary turbulator 500, the rear surface 514 completely extends from the floor 510 to a terminal edge 526 (i.e., top edge) of the front surfaces 502, 504 vertically spaced above the floor. The rear surface 514 is inclined at an angle φ with respect to the Z-axis that may be constant or vary across the lateral widthwise dimension W (along the X axis). And the length of the rear surface 514 (in the Z-axis direction) may be uniform or may be nonuniform across the widthwise dimension W.

The angle φ may be selected to be large enough so that the turbulator 500 has a reasonable overall length in the direction of cooling airflow F, but preferably not so large that a stagnation zone would be present during operation. As an example, the angle φ may average about 45° or less. More specifically, the angle φ may average approximately 30°. By way of further example, in the case of varying angles φ across the widthwise dimension W, a first angle φ3 at the lateral edges of the turbulator 500 may be between 10 and 35 degrees, whereas the second angle φ4 at the widthwise midpoint of the turbulator 500 may be between 20 and 45 degrees. For purposes of illustration in the figures only, the first angle φ3 is 25 degrees, whereas the second angle φ4 is 45 degrees.

Moreover, the rear surface 514 is also inclined at an angle θ with respect to the X-axis that may be constant or vary across along the Z-axis. In this exemplary embodiment, the angle θ varies along the Z-axis. In particular, angle θ varies depending upon the overall length of the turbulator 500 in the Z-direction, the height of the front surfaces 502, 504, and the location of the line of termination 520 where the rear surface 514 meets the floor 510. In this exemplary embodiment, the angle θ may average about 45° or less. More specifically, the angle θ may average approximately 30°. For purposes of illustration in the figures only, angle θ averages approximately 25 degrees.

This second exemplary turbulator 500 includes a rear surface 514 with a first minimum length $L_3$ (along the Z-axis) abutting the first and second vertical walls 506, 508 and a second maximum length $L_4$ slightly offset from the lateral centerline. By way of example, the first length $L_3$ is less than the second length $L_4$, which also corresponds to the angle φ3 being greater than the angle φ4. Those skilled in the art will understand that the lengths $L_3$, $L_4$ may vary depending upon the angle φ chosen, and vice versa, depending upon various factors such as the location of the line of termination 520.

In this exemplary turbulator 500, the front surfaces 502, 504 may comprise a plane angled with respect to the X-axis and, consistent with the differing angles φ3, φ4, the height of the turbulator changes in the X and Z directions. In particular, the height of the turbulator 500 coaxial with the Y-axis adjacent the lateral walls 506, 508 decreases at a uniform rate, whereas the height of the turbulator 500 inset from the lateral walls may decrease at non-uniform rates taking into account the changing angle φ in the Z-direction (compare FIG. 14 to FIGS. 12, 13) as well as the changing angle θ in the X-direction. In addition, a line of termination 520 of the rear surface 514 in this exemplary embodiment is not parallel with a line of inception 522 at the base of the front surfaces 502, 504. In circumstances where the φ3 and φ4 are identical, the line of termination 520 extending laterally may be parallel to the line of inception 522, which likewise evidences a uniform length of the rear surface 514 in the direction of the Z-axis.

In circumstances where particulates are deposited and the surface of the component is intended for convective heat transfer, as introduced previously, these particulates act as insulators and reduce thermal transfer between the flowing fluid and the intended heat transfer surface. In addition to being insulators, particulates also tend to accumulate more in stagnant or recirculating regions. Consequently, the combined effects of particulates within flow fields having stagnant or recirculating flows may lead to a significant reduction in the effective convective thermal transfer. By using one or more turbulators 500, areas of stagnant or recirculating airflow can be significantly reduced.

For example, as shown in FIG. 15, the turbulator 500 may be repeated to further reduce stagnant airflow. In this exemplary configuration, a series of turbulators 500 are spaced apart in a predetermined configuration. More specifically, the distance of a repeating unit, represented by distance "P," may be predetermined based upon the height of the turbulator 500, represented by distance "H." By way of example, the spacing to height ratio (P/H, etc.) may fall within the following range: $5 \leq (P/H) \leq 20$. Alternatively or in addition, the height H of the turbulator 400 may be predetermined based upon the hydraulic diameter of the cooling channel, represented by distance "Dh." Those skilled in the art are familiar with determining the hydraulic diameter for a channel and a detailed description of determining the hydraulic diameter has been omitted for purposes of brevity. For example, the height to hydraulic diameter ratio ($H_1$/Dh, $H_2$/Dh, etc.) may fall within the following range: $0.02 \leq (H/Dh) \leq 0.25$, and more specifically may fall within the range: $0.05 \leq (H/Dh) \leq 0.15$. In further alternative or addition, the height H of the turbulator 500 may be predetermined based upon the length of the rear surface 514, represented by distance "L" (see FIG. 6). For example, the length to height ratio (L/H, etc.) may fall within the following range: $1.2 \leq (L/H) \leq 6$. It should also be noted, however, that the turbulators 500 may be arranged differently than as shown in FIG. 15.

As shown specifically in FIGS. 16-20, a third exemplary chevron turbulator 800 is similar to the first exemplary turbulator 400, but differs in having front surfaces 802, 804 that have heights (in the Y-direction) varying across the lateral dimension (along the X-direction). Moreover, this fifth exemplary chevron turbulator 800 includes top surfaces 813, 815 and rear surfaces 814, 816 having lengths that also vary. For purposes of explanation only, the same coordinate system will be utilized as was described previously for the first exemplary turbulator 400, where a Y-axis extends perpendicularly from the floor 810, an X-axis extends perpendicularly from Y-axis in the lateral or widthwise direction W, and a Z-axis extends perpendicularly from the X-axis and the Y-axis parallel to the bulk average direction of fluid flow F.

The front surfaces 802, 804 surface and are transverse to the direction of airflow F (and the Z-axis) and may be angled±between zero and sixty degrees with respect to the X-axis. By way of example, the accompanying drawings depict the front surfaces 802, 804 as being angled±sixty degrees with respect to the X-axis. A linear vertical edge 817 extends in the Y-direction where the front surfaces 802, 804 meet one another, which is equidistant between the opposed lateral walls 806, 808.

The front surfaces 802, 804 each include varying vertical heights extending in the Y-direction between opposing lateral, vertical walls 806, 808. In exemplary form, the maximum height $H_{max}$ of the front surfaces 802, 804 is where the surfaces meet one another at the vertical edge 817, whereas the minimum height $H_{min}$ is where the surfaces meet the lateral walls 806, 808. The change in height of the front surfaces 802, 804 occurs at a constant rate across the lateral direction, consistent with a linear top edge 822 extending between the vertical edge 817 and one of the lateral walls 806, 808.

The lateral walls 806, 808 extend along the Y and Z axes and are bridged by the floor 810 and a ceiling 812, both of which extend along the X and Z axes. In exemplary form, the floor 810 comprises a planar surface, whereas the walls 806, 808 also embody planar surfaces that each extends perpendicular to the floor. It should be noted, however, that the opposing walls 806, 808 need not be planar, nor angled perpendicularly with respect to the floor 810. Likewise, it should be understood that the floor 810 need not be planar or angled perpendicularly with respect to either or both of the lateral walls 806, 808.

The top surfaces 813, 815 extend along the X and Z axes and may be planar and angled approximately ninety degrees with respect to the front surfaces 802, 804 (and Y axis). In exemplary form, the top surfaces 813, 815 are angled other than parallel with respect to the floor 810 and has a generally trapezoidal shape with opposing lateral sides delineating the depth in the Z-direction, which changes laterally (in the X-direction) consistent with the changing height of the front surfaces 802, 804. In other words, the depth of the top surfaces 813, 815 is approximately the same as the height of the front surfaces 802, 804 proportionally along the widthwise dimension so that as the height of the front surfaces 802, 804 decreases so too does the depth of the top surfaces 813, 815. In this exemplary embodiment, the lateral sides are parallel, but have different lengths, whereas the forward and rear sides (delineating the width in the X-direction) are equidistant but not parallel. By way of example, the top surfaces may have a length in the Z-direction ranging from zero to the height of the front surfaces 802, 804. It should be noted, however, that the top surfaces 813, 815 need not embody a trapezoidal shape or for that matter a four sided shape. It should also be noted that the top surfaces 813, 815 may be omitted so that the front surfaces 802, 804 and rear surfaces 814, 816 directly meet one another.

In this exemplary turbulator 800, the rear surfaces 814, 816 completely extend from the floor 810 to the top edge 822 (having a V-shape) of the top surfaces 813, 815. The rear surfaces 814, 816 are inclined at an angle ϕ that may be constant or vary across the lateral widthwise dimension W (along the X axis). In this exemplary embodiment, the angle ϕ varies across the lateral/widthwise dimension, with a maximum angle $\phi_{MAX}$ being where the maximum vertical height of the front surfaces 802, 804 is, while the minimum angle $\phi_{MIN}$ being where the minimum vertical height of the front surfaces 802, 804 is. Said another way, the length of the rear surfaces 814, 816 (in the direction of the Z-axis) are nonuniform across the widthwise dimension. Those skilled in the art will understand that the lengths of the rear surfaces 814, 816 may vary depending upon the angle ϕ chosen and the height of the front surfaces 802, 804, for example. A sloped trough 828 is formed where the rear surfaces 814, 816 meet one another, which in exemplary form may be equidistant between the opposed lateral walls 806, 808.

The angle ϕ may be selected to be large enough so that the turbulator 800 has a reasonable overall length in the direction of cooling airflow F, but preferably not so large that a stagnation zone would be present during operation. As an example, the angle ϕ may average about 45° or less. More specifically, the angle ϕ may average approximately 30°. For purposes of illustration in the figures only, angle ϕ varies between 20 degrees and 45 degrees.

In this exemplary turbulator 800, the front surfaces 802, 804 are planar and are angled forty-five degrees with respect to the X-axis and ninety degrees with respect to one another. In exemplary form, a line of termination 820 of the rear surfaces 814, 816 extends in a V-shape and may be parallel with the line of origination 822 at the base of the front surfaces 802, 804. In circumstances where angle ϕ is non-uniform and the height of the front surfaces 802, 804 varies across the lateral direction, such as the instant case, the line of termination 820 may nonetheless be parallel to the line of inception 822.

In this exemplary embodiment, any longitudinal cross-section taken along the Z-axis of the turbulator 800 reflects a triangular shape 842, where the hypotenuse and the vertical leg of the triangle changes, while the horizontal leg extending along the floor 810 remains constant. In particular, the In circumstances where particulates are deposited and the surface of the component is intended for convective heat transfer, as introduced previously, these particulates act as insulators and reduce thermal transfer between the flowing fluid and the intended heat transfer surface. In addition to being insulators, particulates also tend to accumulate more in stagnant or recirculating regions. Consequently, the combined effects of particulates within flow fields having stagnant or recirculating flows may lead to a significant reduction in the effective convective thermal transfer. By using one or more turbulators 800, areas of stagnant or recirculating airflow can be significantly reduced.

Figure 21:
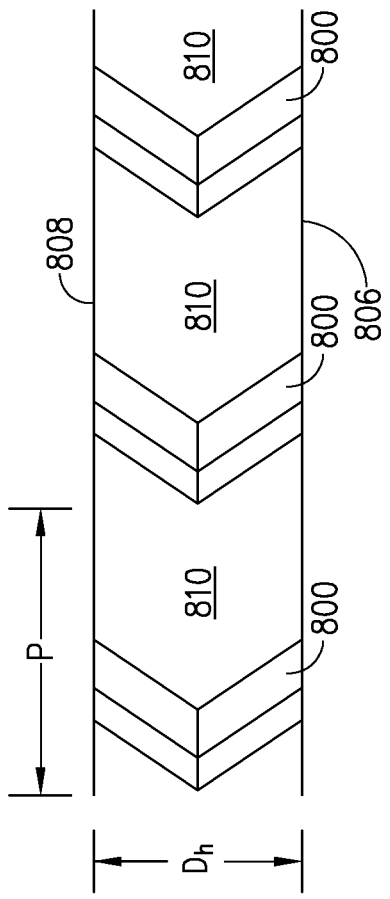
FIG. 21 is top view a series of the exemplary embodiments of FIG. 16 distributed within a cooling channel.
Figure 20:
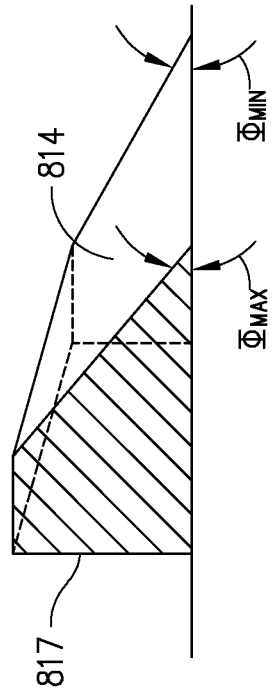
FIG. 20 is a cross-sectional view of the exemplary embodiment of FIG. 16 taken along line 20-20.
Figure 22:
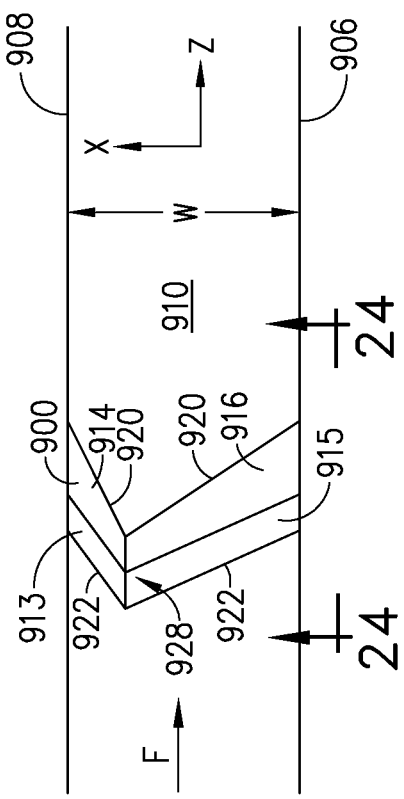
FIG. 22 is a top view of a fourth exemplary embodiment of a turbulator in accordance with the instant disclosure.
Figure 28:
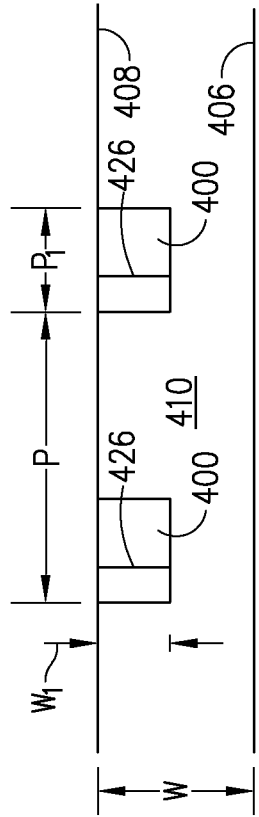
FIG. 28 is a profile view of the first exemplary embodiment of FIG. 26.

For example, as shown in FIG. 21, the turbulator 800 may be repeated to further reduce stagnant airflow. In this exemplary configuration, a series of turbulators 800 are spaced apart in a predetermined configuration. More specifically, the distance of a repeating unit, represented by distance "P," may be predetermined based upon the height of the turbulator 800, represented by distance "H." By way of example, the spacing to height ratio (P/H, etc.) may fall within the following range: $5 \leq (P/H) \leq 20$. Alternatively or in addition, the height H of the turbulator 400 may be predetermined based upon the hydraulic diameter of the cooling channel, represented by distance "Dh." Those skilled in the art are familiar with determining the hydraulic diameter for a channel and a detailed description of determining the hydraulic diameter has been omitted for purposes of brevity. For example, the height to hydraulic diameter ratio ($H_1$/Dh, $H_2$/Dh, etc.) may fall within the following range: $0.02 \leq (H/Dh) \leq 0.25$, and more specifically may fall within the range: $0.05 \leq (H/Dh) \leq 0.15$. In further alternative or addition, the height H of the turbulator 800 may be predetermined based upon the length of the rear surface 814, represented by distance "L" (see FIG. 19). For example, the length to height ratio (L/H, etc.) may fall within the following range: $1.2 \leq (L/H) \leq 6$. It should also be noted, however, that the turbulators 800 may be arranged differently than as shown in FIG. 21.

As shown specifically in FIGS. 22-25, a fourth exemplary chevron turbulator 900 includes a pair of front surfaces 902, 904 that have heights (in the Y-direction) varying across the lateral direction (along the X-axis). Moreover, this sixth exemplary chevron turbulator 900 includes top surfaces 913, 915 and rear surfaces 914, 916 having lengths that also vary. It should be noted, however, that the front surfaces 902, 904 may have constant heights in the alternative. For purposes of explanation only, the same coordinate system will be utilized as was described previously for the first exemplary turbulator 400, where a Y-axis extends perpendicularly from the floor 910, an X-axis extends perpendicularly from Y-axis in the lateral or widthwise direction W, and a Z-axis extends perpendicularly from the X-axis and the Y-axis parallel to the bulk average direction of fluid flow F.

The front surfaces 902, 904 surface and are transverse to the direction of airflow F (and the Z-axis) and may be angled±between zero and sixty degrees with respect to the X-axis. By way of example, the accompanying drawings depict the first front surfaces 902 as being angled±forty degrees with respect to the X-axis, while the second front surface 904 is depicted as being angled±twenty-five degrees with respect to the X-axis. A vertical edge 917 extends in the Y-direction where the front surfaces 902, 904 meet one another, which is closer to one lateral wall 908 than to the other lateral wall 906.

The front surfaces 902, 904 each include varying vertical heights extending in the Y-direction between opposing lateral, vertical walls 906, 908. In exemplary form, the minimum height $H_m$ of the front surfaces 902, 904 is where the surfaces meet one another at the vertical edge 917, whereas a maximum height $H_x$ for both front surfaces 902, 904 is where the surfaces meet the lateral walls 906, 908. It should be noted, however, that the height $H_x$ for both front surfaces 902, 904 need not be the same. The change in height of each of the front surfaces 902, 904 occurs at a constant rate from the vertical edge 917 to one of the lateral walls 906, 908 across the lateral direction, consistent with a linear top edge 922. Again, it should be noted that this constant rate may differ for each of the lateral walls 902, 904. For example, the slope of the linear top edge 922 may not be the same for each front surface 902, 904. More specifically, the slope of the linear top edge 922 for the first front surface 902 is greater than the slope of the linear top edge for the second front surface 904.

The lateral walls 906, 908 extend along the Y and Z axes and are bridged by the floor 910 and a ceiling 912, both of which extend along the X and Z axes. In exemplary form, the floor 910 comprises a planar surface, whereas the walls 906, 908 also embody planar surfaces that each extends perpendicular to the floor. It should be noted, however, that the opposing walls 906, 908 need not be planar, nor angled perpendicularly with respect to the floor 910. Likewise, it should be understood that the floor 910 need not be planar or angled perpendicularly with respect to either or both of the lateral walls 906, 908.

The top surfaces 913, 915 extend along the X and Z axes and may be planar and angled approximately ninety degrees with respect to the front surfaces 902, 904 (and Y axis). In exemplary form, the top surfaces 913, 915 are angled other than parallel with respect to the floor 910 and have a generally trapezoidal shape with opposing lateral sides delineating the depth in the Z-direction, which changes laterally (in the X-direction) consistent with the changing height of the front surfaces 902, 904. In other words, the depth of the top surfaces 913, 915 is approximately the same as the height of the front surfaces 902, 904 proportionally along the widthwise dimension so that as the height of the front surfaces 902, 904 decreases so too does the depth of the top surfaces 913, 915. In this exemplary embodiment, the lateral sides are parallel, but have different lengths, whereas the forward and rear sides (delineating the width in the X-direction) are equidistant but not parallel. By way of example, the top surfaces may have a length in the Z-direction ranging from zero to the height of the front surfaces 902, 904. It should be noted, however, that the top surfaces 913, 915 need not embody a trapezoidal shape or for that matter a four sided shape. It should also be noted that the top surfaces 913, 915 may be omitted so that the front surfaces 902, 904 and rear surfaces 914, 916 directly meet one another.

In this exemplary turbulator 900, the rear surfaces 914, 916 completely extend from the floor 910 to the top edge 922 (having a V-shape) of the front surfaces 902, 904. A sloped trough 928 is formed where the rear surfaces 914, 916 meet one another, which in exemplary form may be equidistant between the opposed lateral walls 906, 908. The rear surfaces 914, 916 are inclined at an angle φ that may be constant or vary across the lateral widthwise dimension W (along the X axis). In this exemplary embodiment, the angle φ varies across the lateral/widthwise dimension, with a maximum angle $\phi_{MAX}$ being where the maximum vertical height $H_x$ of the front surfaces 902, 904 is, while the minimum angle $\phi_{MIN}$ being where the minimum vertical height $H_m$ of the front surfaces 902, 904 is proximate the vertical edge 917. Said another way, the length of the rear surfaces 914, 916 (between the top edge 922 and the line of termination 920 in the Z-direction) may be uniform or may be nonuniform across the widthwise dimension W.

The angle φ may be selected to be large enough so that the turbulator 900 has a reasonable overall length in the direction of cooling airflow F, but preferably not so large that a stagnation zone would be present during operation. As an example, the angle φ may average about 45° or less. More specifically, the angle φ may average approximately 30°. For purposes of illustration in the figures only, angle φ varies between 20 degrees and 45 degrees.

As introduced previously, this sixth exemplary turbulator 900 includes rear surfaces 914, 916 with lengths L in the Z-direction that vary across the widthwise dimension W (X-axis direction) of the turbulator. In exemplary form, the maximum length $L_9$ of the rear surfaces 914, 916 occurs where the maximum angle $\phi_{MAX}$ occurs (e.g., adjacent the lateral walls 906, 908), while the minimum length $L_{10}$ of the rear surfaces occurs where the minimum angle $\phi_{MIN}$ occurs (e.g., adjacent where the rear surfaces 914, 916 meet one another). Those skilled in the art will understand that the lengths of the rear surfaces 914, 916 may vary depending upon the angle φ chosen and the height of the front surfaces 902, 904, for example.

In this exemplary turbulator 900, the front surfaces 902, 904 are planar and are angled forty-five and twenty-five degrees, respectively, as to the X-axis and one hundred and ten degrees with respect to one another. In exemplary form, a line of termination 920 of the rear surfaces 914, 916 extends in a nonuniform V-shape and may be parallel with the line of origination 922 at the base of the front surfaces 902, 904. In circumstances where angle φ is nonuniform and the height of the front surfaces 902, 904 varies across the lateral direction, such as the instant case, the line of termination 920 may not be parallel to the line of inception 922.

As shown specifically in FIG. 25, any longitudinal cross-section taken along the X-axis of the turbulator 900 reflects a triangular shape 942, where the hypotenuse 950 and the vertical leg 952 of the triangle changes, as does the horizontal leg 954 extending along the floor 910.

In circumstances where particulates are deposited and the surface of the component is intended for convective heat transfer, as introduced previously, these particulates act as insulators and reduce thermal transfer between the flowing fluid and the intended heat transfer surface. In addition to being insulators, particulates also tend to accumulate more in stagnant or recirculating regions. Consequently, the combined effects of particulates within flow fields having stagnant or recirculating flows may lead to a significant reduction in the effective convective thermal transfer. By using one or more turbulators 900, areas of stagnant or recirculating airflow can be significantly reduced.

For example, the turbulator 900 may be repeated to further reduce stagnant airflow. In this exemplary configuration, a series of turbulators 900 are spaced apart in a predetermined configuration. More specifically, the distance of a repeating unit, represented by distance "P," may be predetermined based upon the height of the turbulator 900, represented by distance "H." By way of example, the spacing to height ratio (P/H, etc.) may fall within the following range: $5 \leq (P/H) \leq 20$. Alternatively or in addition, the height H of the turbulator 400 may be predetermined based upon the hydraulic diameter of the cooling channel, represented by distance "Dh." Those skilled in the art are familiar with determining the hydraulic diameter for a channel and a detailed description of determining the hydraulic diameter has been omitted for purposes of brevity. For example, the height to hydraulic diameter ratio ($H_1$/Dh, $H_2$/Dh, etc.) may fall within the following range: $0.02 \leq (H/Dh) \leq 0.25$, and more specifically may fall within the range: $0.05 \leq (H/Dh) \leq 0.15$. In further alternative or addition, the height H of the turbulator 900 may be predetermined based upon the length of the rear surface 914, represented by distance "L" (see FIG. 25). For example, the length to height ratio (L/H, etc.) may fall within the following range: $1.2 \leq (L/H) \leq 6$. It should also be noted, however, that the turbulators 900 may be arranged differently than as shown in FIG. 26.

As described herein, the exemplary turbulators 400, 500, 800, 900 may have various dimensions. For example, the height (in the Y-direction) of the front surface 402, 502, 802, 902 of the turbulators 400, 500, 800, 900 is selected to be large enough so that each turbulator is effective in producing turbulence. More specifically, the height of the front surface 402, 502, 802, 902 is significantly larger than any subsurface imperfections in the component surface (i.e., floor), but generally not so large as to form a significant flow blockage.

Moreover, the exemplary turbulators 400, 500, 800, 900 may incorporate a curved rear surface 414, 514, 814, 914 in lieu of the planar rear surface. Moreover, the lengths of a curved rear surface 414, 514, 814, 914 (taken in the Z-direction) may vary across the lateral direction (W direction, parallel to the X-axis) when used in lieu of the planar rear surfaces described for the foregoing turbulators 400, 500, 800, 900.

It should also be understood that while the some foregoing exemplary embodiments have been described as having rear surfaces meeting the floor, it is also within the scope of the disclosure to terminate the rear surfaces above the floor. In such a circumstance, the terminal edge of the rear surfaces may exhibit a step change in height in comparison to the height of the adjacent floor.

Moreover, while the foregoing exemplary turbulators 400, 500, 800, 900 have been described in exemplary form having a particular orientation (commensurate with the figures) with respect to adjacent walls, it is also within the scope of the disclosure to rotate the turbulators 400, 500, 800, 900 about the Y-axis to change the orientation of the turbulators with respect to the adjacent walls and, in particular, which surface is the leading surface in the direction of airflow F. For example, the exemplary turbulators may be one or both rotated twenty degrees. Those skilled in the art will understand the rotational changes that may be made to any of the foregoing exemplary turbulators 400, 500, 800, 900 based upon the structure disclosed and the explanation that the rotational position may be varied in all 360 degrees in comparison with the depictions in the figures.

While each of the foregoing exemplary turbulators 400, 500, 800, 900 has been depicted to have a rear surfaces 414, 514, 814, 914 with trapezoidal boundaries (parallel ends adjacent the walls, as well as termination lines front and rear), it is also within the scope of the disclosure to have a boundary that is a quadrilateral or other multi-sided boundary.

It should also be understood that while the interface between two or more surfaces (surfaces of the turbulators, surfaces of walls, etc.) may have been depicted in the drawings to have a sharp point or edge, in practice when fabricating components for use in jet engines within the scope of the instant disclosure, the interface between two or more surfaces need not come to a point or sharp edge. Rather, the surfaces may join one another via a radius or fillet. Consequently, those skilled in the art should understand that the depicted point or sharp edge between surfaces also encompasses and represents curved or rounded surface interfaces.

It should be further understood that while the foregoing exemplary turbulators 400, 500, 800, 900 have been described in exemplary form as being within a confined channel (opposing lateral walls bridged by a floor and ceiling), it is also within the scope of the disclosure to utilize the turbulators 400, 500, 800, 900 to arise from any surface, whether or not adjacent lateral walls or an adjacent lateral wall exists, and regardless of the presence of an opposing surface corresponding to the surface from which the turbulators extend (e.g., a floor vs. ceiling, one wall vs. opposing wall, etc.).

The turbulators described herein are usable in any structure where heat transfer is intended such as, without limitation, any structure where prior art cooling channels were provided. Nonlimiting examples of such structures include gas turbine engine combustor liners, stationary (i.e. frame) structures, turbine shrouds and hangers, and the interiors of stationary or rotating engine airfoils such as nozzles and blades. The components described above should be considered as merely exemplary of a heat transfer structure and may be incorporated into the casting of a component, may be machined into an existing subsurface, or may be provided as separate structures that are then attached to a surface.

Exemplary partial span corner turbulators in accordance with the instant disclosure may exhibit various geometries, but all partial span corner turbulators have in common an upright front surface that generally faces the oncoming direction of cooling airflow F, and a rear surface that defines a ramp-like shape inclining/declining from the front surface toward at least one of a lateral wall, a floor, and/or a ceiling.

As shown specifically in FIGS. 26-29, a first exemplary partial span corner turbulator 400 includes a front surface 402, a top surface 413, and a rear surface 414, all extending above a floor 410. For purposes of explanation only, a coordinate system is established as part of describing the features of the exemplary partial span corner turbulator 400, where a Y-axis extends perpendicularly from the floor 410, an X-axis extends perpendicularly from Y-axis in the lateral or widthwise direction W, and a Z-axis extends perpendicularly from the X-axis and the Y-axis parallel to the direction of fluid flow F. In this exemplary embodiment, the partial span corner turbulator 400 includes a trapezoidal cross-section taken along the X-direction (coaxial with the X-axis). The front surface 402 faces and is transverse to the bulk average direction of airflow F (and the Z-axis) and may be angled between zero and seventy-five degrees with respect to the Y-axis. By way of example, the accompanying drawings depict the front surface 402 as being angled zero degrees with respect to the Y-axis. Moreover, the front surface may be angled between zero and sixty degrees with respect to the X-axis. By way of example, the accompanying drawings depict the front surface 402 as being angled zero degrees with respect to the X-axis.

The front surface 402 includes a substantially constant height in the widthwise direction W (parallel to the X-axis) and extends between opposing vertical, lateral walls 406, 408 that extend along the Y and Z axes, but does not completely extend between the lateral walls 406, 408. Specifically, the partial span corner turbulator 400 is joined to one lateral wall 408 and separated by a lateral space from the opposing lateral wall 406. These lateral walls 406, 408 are bridged by the floor 410 and a ceiling 412, both of which extend along the X and Z axes. In exemplary form, the floor 410 comprises a planar surface, whereas the walls 406, 408 also embody planar surfaces that each extends perpendicular to the floor. It should be noted, however, that the opposing walls 406, 408 need not be planar, nor angled perpendicularly with respect to the floor 410. Likewise, it should be understood that the floor 410 need not be planar or angled perpendicularly with respect to either or both of the lateral walls 406, 408.

The top surface 413 extends along the X and Z axes and may be planar and angled approximately ninety degrees with respect to the front surface 402 (and Y axis). In exemplary form, the top surface 413 is parallel to the floor 410 and has a generally four-sided shape with opposing lateral sides delineating the depth in the Z-direction, which is approximately equal to the height of the front surface 402. In this exemplary embodiment, the lateral sides are equidistant, as are the forward and rear sides that establish the depth of the top surface 413, thereby delineating a rectangular shape. It should be noted, however, that the top surface 413 need not embody a rectangular shape or for that matter a four sided shape. It should also be noted that the top surface 413 may be omitted so that the front surface 402 and rear surface 414 directly meet one another.

In this exemplary partial span corner turbulator 400, the rear surface 414 completely extends from the floor 410 to a terminal edge 426 (i.e., top edge) of the top surface 413 vertically spaced above the floor. The rear surface 414 is inclined at an angle $\phi$ with respect to that Z-axis that may be constant or vary across the lateral widthwise dimension W (along the X axis). Said another way, the length of the rear surface 414 (between the terminal edge 426 and the line of termination 420 in the Z-axis direction) may be uniform or may be nonuniform across the widthwise dimension W.

Figure 29:
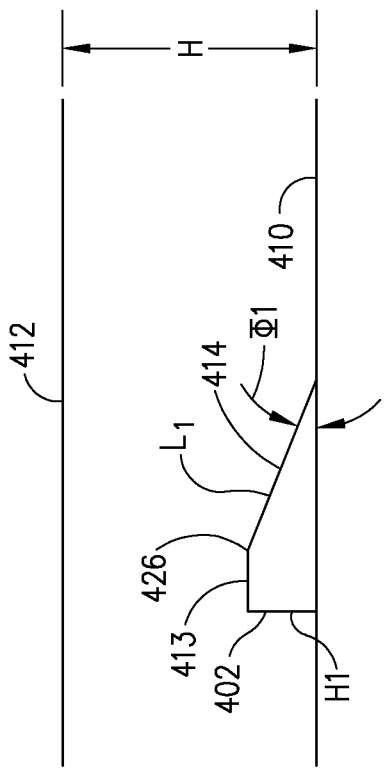
FIG. 29 is an elevated perspective view from the front left of the first exemplary embodiment of FIG. 26.

Referring specifically to FIG. 29, the angle $\phi_1$ may be selected to be large enough so that the partial span corner turbulator 400 has a reasonable overall length in the direction of cooling air flow F, but preferably not so large that a flow recirculation zone would be present during operation. As an example, the angle $\phi_1$ may average about 45° or less. More specifically, the angle $\phi$ may average approximately 30°. By way of further example, for purposes of illustration in the figures only, angle $\phi_1$ is 20 degrees.

Referring back to FIGS. 26-29, this first exemplary partial span corner turbulator 400 includes a rear surface 414 with a first length $L_1$ abutting the first lateral wall 408 that may be constant for cross-sections taken in the X-direction. In alternate exemplary form, the first length $L_1$ may vary in the X-direction such as when the angle $\phi_1$ is not constant in the X-direction or when the front surface 402 is angled other than zero degrees with respect to the X-axis. Those skilled in the art will understand that the length $L_1$ may vary depending upon various factors.

In this exemplary partial span corner turbulator 400, the front surface 402 may be coplanar with the X-Y plane and, consistent with the uniform angle $\phi_1$, the height of the partial span corner turbulator may be uniform or change along the Z and Y axes. In this exemplary embodiment as depicted in the figures, the height $H_1$ of the partial span corner turbulator remains constant in the X-direction. But it is also within the scope of this disclosure for the height $H_1$ to vary in the X-direction. Consistent with the uniform angle $\phi_1$ and the constant height $H_1$, a line of termination 420 where the rear surface 414 meets the floor 410 may be parallel with a line of inception 422 at the base of the front surface 402. In circumstances where the $\phi_1$ varies in the X-direction or where the height varies in the X-direction, for example, the line of termination 420 may not be parallel to the line of inception 422.

In circumstances where particulates are deposited and the surface of the component is intended for convective heat transfer, as introduced previously, these particulates act as insulators and reduce thermal transfer between the flowing fluid and the intended heat transfer surface. These particulates tend to become trapped in flow recirculation and separation regions leading to a higher probability of accumulation and the formation of a thermal resistance. By using one or more partial span corner turbulators 400, reduction of the stagnation and recirculation flow regions in comparison to the conventional cooling enhancement methods can be achieved.

Figure 9:
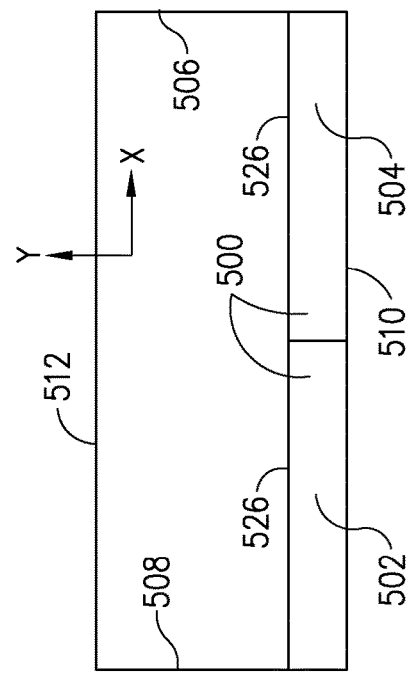
FIG. 9 is a front view of the second exemplary embodiment of FIG. 8.
Figure 10:
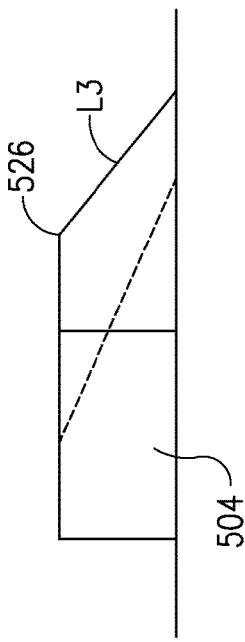
FIG. 10 is a right side profile view of the first exemplary embodiment of FIG. 8.
Figure 30:
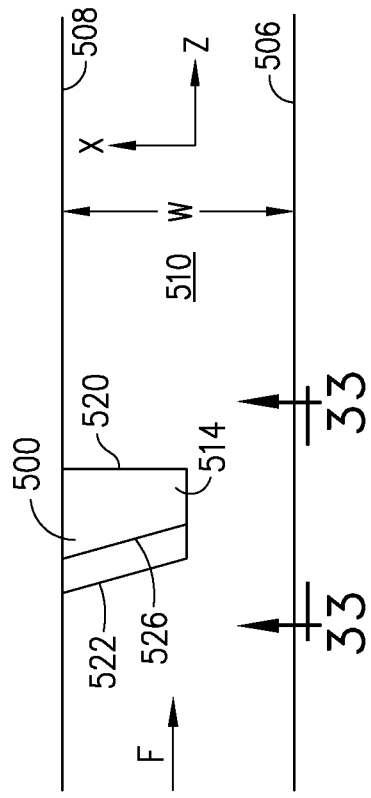
FIG. 30 is a top view a series of the exemplary embodiments of FIG. 26 distributed within a cooling channel.
Figure 31:
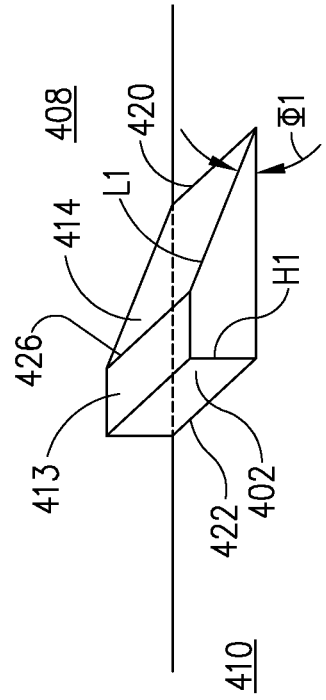
FIG. 31 is a top view of a second exemplary embodiment of a partial span corner turbulator in accordance with the instant disclosure.
Figure 32:
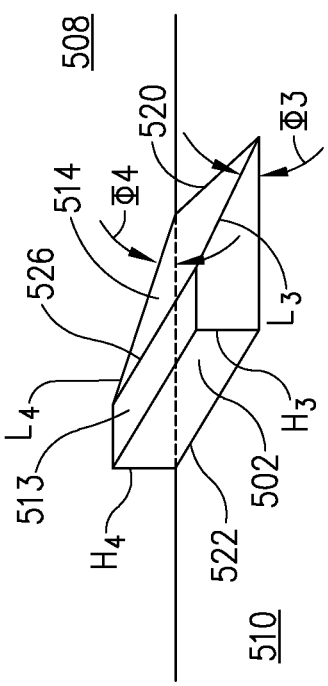
FIG. 32 is a front view of the second exemplary embodiment of FIG. 31.
Figure 33:
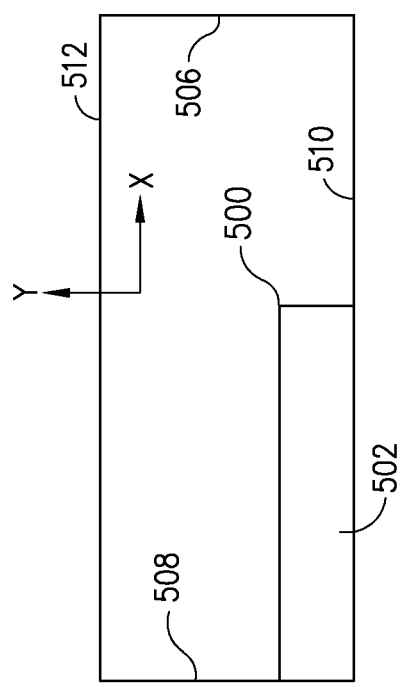
FIG. 33 is a profile view of the second exemplary embodiment of FIG. 31.

For example, as shown in FIG. 30, the exemplary partial span corner turbulators 400 may be arranged in rows and there may be a correlation between the spacing of the partial span corner turbulator 400 and the dimensions of the pins themselves. In this exemplary configuration, a series of partial span corner turbulators 400 are spaced apart in a predetermined configuration. More specifically, the distance of a repeating unit, represented by distance "P," may be predetermined based upon the height of the partial span corner turbulator 400, represented by distance "$H_1$" (see FIG. 8). By way of example, the spacing to height ratio ($P/H_1$, etc.) may fall within the following range: $5 \leq (P/H) \leq 20$. Alternatively or in addition, the width $W_1$ of the partial span corner turbulator 400 may be predetermined based upon the width between the opposing walls 406, 408, represented by distance "W." For example, the partial span corner turbulator 400 width to channel width ratio ($W_1/W$, etc.) may fall within the following range: $0.45 \leq (W_1/W) \leq 0.8$. In further alternative or addition, the height H of the partial span corner turbulator 400 may be predetermined based upon the height of the channel (e.g., the distance between the floor 410 and the ceiling 412) represented by distance "H" (see FIG. 7). For example, the partial span corner turbulator 400 height to channel height ratio ($H_1/H$, etc.) may fall within the following range: $0.02 \leq (H_1/H) \leq 0.5$. In still a further alternative, the longitudinal spacing between partial span corner turbulators 400 may be established using the ratio P to P1 (P/P1), where the ratio is between 2.0 and 10.0. It should also be noted, however, that the partial span corner turbulator 400 may be arranged differently than as shown in FIG. 9.

In addition, the partial span corner turbulators 400 may be positioned front-to-back so that the density of the partial span corner turbulators is maximized. Likewise, this series orientation of the partial span corner turbulators 400 is operative to reduce the exposed surface area of the floor 410 in between the pins. Alternatively, the partial span corner turbulators 400 may be arranged to oppose one another on opposite lateral walls 406, 408. Moreover, the partial span corner turbulators 400 may be spaced apart to expose the floor 410 in between pins, where the spacing between pins is uniform (the pins adjacent the lateral wall 406), or the spacing between the pins in a series may vary (such as incrementally increasing the spacing between pins adjacent the lateral wall 408). In addition, the partial span corner turbulators 400 may be oriented along opposing walls 406, 408 so that no pin is laterally opposite another pin. Rather, the partial span corner turbulators 400 may be staggered in an alternating pattern along the opposing walls 406, 408.

As shown specifically in FIGS. 31-34, a second exemplary partial span corner turbulator 500 includes a front surface 502, a top surface 513, and a rear surface 514, all extending above a floor 510. For purposes of explanation only, the same coordinate system will be utilized as was described previously for the first exemplary partial span corner turbulator 400. The front surface 502 is transverse to the bulk average direction of airflow F (and the Z-axis) and may be angled between zero and seventy-five degrees with respect to the Y-axis. By way of example, the accompanying drawings depict the front surface 502 as being angled zero degrees with respect to the Y-axis. In this exemplary embodiment, the partial span corner turbulator 500 includes a triangular cross-section taken along the X-direction (coaxial with the X-axis), where the hypotenuse of the triangle is the rear surface and the two legs comprise the front surface 502 and the floor 510. In addition, the front surface 502 need not be parallel to the widthwise axis (the X-axis) and may be angled greater than zero and up to sixty degrees with respect to the X-axis. By way of example, the accompanying drawings depict the front surface 502 as being angled fifteen degrees with respect to the X-axis.

The front surface 502 includes a substantially constant height $H_4$ in the widthwise direction W (parallel to the X-axis) and extends between opposing vertical, lateral walls 506, 508 that extend along the Y and Z axes, but does not completely extend between the lateral walls 506, 508. Specifically, the partial span corner turbulator 500 is joined to one lateral wall 508 and separated by a lateral space from the opposing lateral wall 506. These walls 506, 508 are bridged by the floor 510 and a ceiling 512, both of which extend along the X and Z axes. In exemplary form, the floor 510 comprises a planar surface, whereas the walls 506, 508 also embody planar surfaces that each extends perpendicular to the floor. It should be noted, however, that the opposing walls 506, 508 need not be planar, nor angled perpendicularly with respect to the floor 510. Likewise, it should be understood that the floor 510 need not be planar or angled perpendicularly with respect to either or both of the lateral walls 506, 508.

The top surface 513 extends along the X and Z axes and may be planar and angled approximately ninety degrees with respect to the front surface 502 (and Y axis). In exemplary form, the top surface 513 is parallel to the floor 510 and has a generally four-sided shape with opposing lateral sides delineating the depth in the Z-direction, which is approximately equal to the height of the front surface 502. In this exemplary embodiment, the lateral sides are equidistant, as are the forward and rear sides that establish the depth of the top surface 513, thereby delineating a quadrilateral shape. It should be noted, however, that the top surface 513 need not embody a quadrilateral shape or for that matter a four sided shape. It should also be noted that the top surface 513 may be omitted so that the front surface 502 and rear surface 514 directly meet one another.

In this exemplary partial span corner turbulator 500, the rear surface 514 completely extends from the floor 510 to a terminal edge 526 (i.e., top edge) of the top surface 513 vertically spaced above the floor. The rear surface 514 is inclined at an angle ϕ that may be constant or vary across the lateral widthwise dimension W (along the X axis). Said another way, the length of the rear surface 514 (between the terminal edge 526 and the line of termination 520 in the Z-axis direction) may be uniform or may be nonuniform across the widthwise dimension W.

Figure 34:
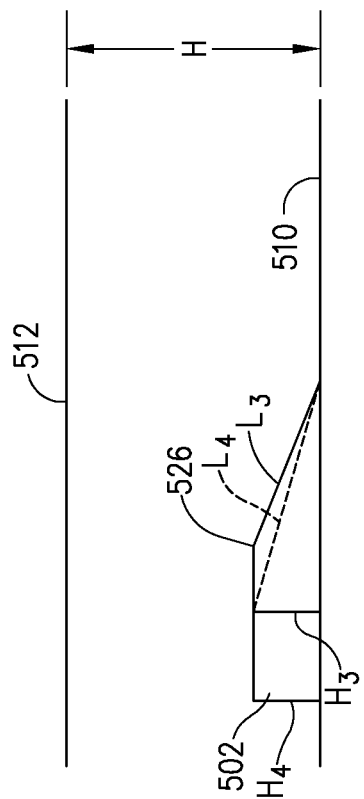
FIG. 34 is an elevated perspective view from the front left of the second exemplary embodiment of FIG. 31.
Figure 35:
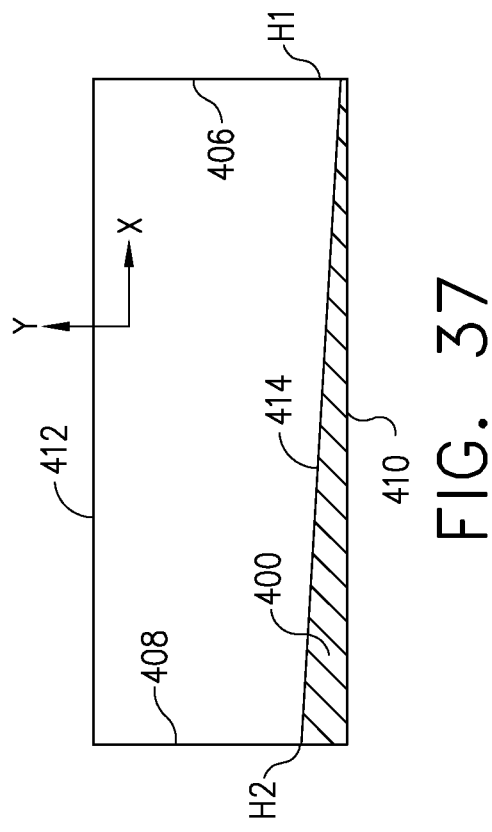
FIG. 35 is a top view of a first exemplary embodiment of a turbulator in accordance with the instant disclosure.
Figure 37:
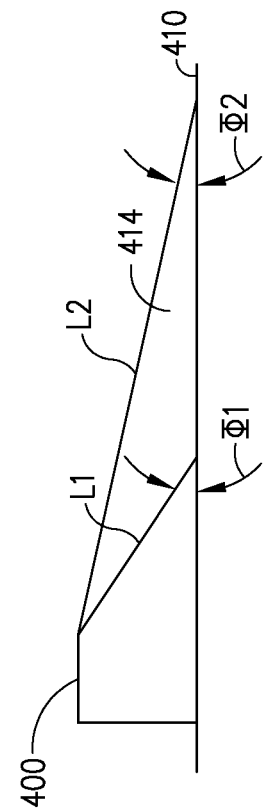
FIG. 37 is a cross-sectional view of the first exemplary embodiment of FIG. 35.
Figure 36:
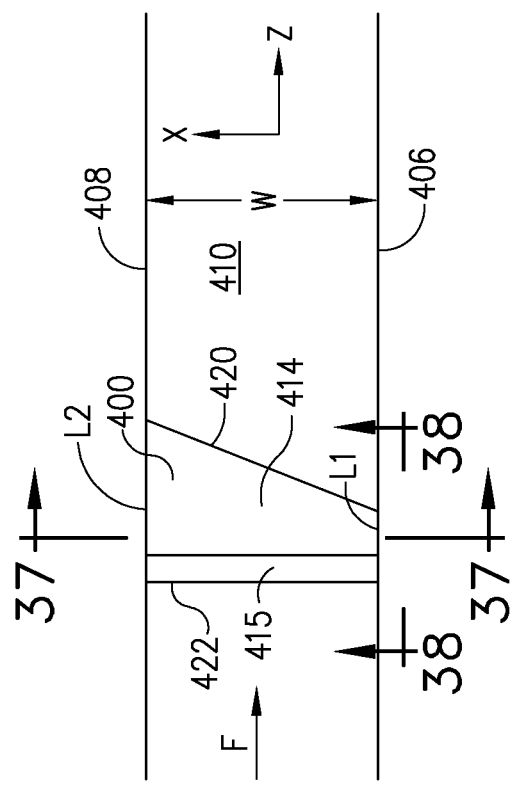
FIG. 36 is a front view of the first exemplary embodiment of FIG. 35.

Referring to FIG. 34, the angle ϕ may be selected to be large enough so that the partial span corner turbulator 500 has a reasonable overall length in the direction of cooling air flow F, but preferably not so large that a flow recirculation zone would be present during operation. As an example, the angle ϕ may average about 45° or less. More specifically, the angle ϕ may average approximately 30°. By way of further example, in the case of varying angles ϕ across the widthwise dimension W, a first angle ϕ3 at one lateral edge of the partial span corner turbulator 500 may be between 45 and 20 degrees, whereas the second angle ϕ4 at an opposing lateral edge of the partial span corner turbulator 500 adjacent the lateral wall 508 may be between 45 and 20 degrees. For purposes of illustration in the figures only, the first angle ϕ3 is 25 degrees, whereas the second angle ϕ4 is 20 degrees.

Referencing back to FIGS. 31-34, this second exemplary partial span corner turbulator 500 includes a rear surface 514 with a first length $L_3$ nearest the first lateral wall 506 and a second length $L_4$ abutting the second lateral wall 508. By way of example, the first length $L_3$ is less than the second length $L_4$, which also corresponds to the angle ϕ3 being greater than the angle ϕ4. Had the second length $L_4$ been less than the first length $L_3$ in this example, the angle ϕ4 may have been greater than the angle ϕ3. Those skilled in the art will understand that the lengths $L_3$, $L_4$ may vary depending upon the angle ϕ chosen and upon various other factors.

In this exemplary partial span corner turbulator 500, the front surface 502 has a height H (in the Y-direction) that remains constant in the lateral direction (X-direction). But the height $H_4$ adjacent the second lateral wall 508 decreases at a slower rate (rate equals height divided by length) than does the height $H_3$ adjacent the first lateral wall 506. More specifically, at a cross-section taken perpendicular to the Z-axis where the front surface 502 originates farthest from the lateral wall 508, the height $H_4$ is smaller than $H_3$. Moreover, if a further cross-section is taken perpendicular to the Z-axis where the rear surface 514 meets the floor 510, $H_4$ is equal to $H_3$, which are both zero. In this exemplary embodiment, a line of termination 520 of the rear surface 514 is not parallel with a line of inception 522 at the base of the front surface 502. In circumstances where the ϕ3 and ϕ4 are identical, the line of termination 520 may be parallel to the line of inception 522 (when the height of the front surface 502 is uniform at the line of inception), which likewise evidences a uniform length of the rear surface 514 in the direction of the Z-axis.

In circumstances where particulates are deposited and the surface of the component is intended for convective heat transfer, as introduced previously, these particulates act as insulators and reduce thermal transfer between the flowing fluid and the intended heat transfer surface. These particulates tend to become trapped in flow recirculation and separation regions leading to a higher probability of accumulation and the formation of a thermal resistance. By using one or more partial span corner turbulators 500, reduction of the stagnation and recirculation flow regions in comparison to the conventional cooling enhancement methods can be achieved.

Exemplary turbulators in accordance with the instant disclosure may exhibit various geometries, but all turbulators have in common an upright front surface that generally faces the direction of cooling airflow F, and a back surface that defines a ramp-like shape inclining/declining from the front surface toward a ceiling or floor.

As shown specifically in FIGS. 35-39, a first exemplary turbulator 400 includes a front surface 402, a top surface 413, and a rear surface 414, all extending above a floor 410. For purposes of explanation only, a coordinate system is established as part of describing the features of the exemplary turbulator 400, where a Y-axis extends perpendicularly from the floor 410, an X-axis extends perpendicularly from Y-axis in the lateral or widthwise direction W, and a Z-axis extends perpendicularly from the X-axis and the Y-axis parallel to the bulk average direction of fluid flow F. The front surface 402 surfaces and is transverse to the bulk average direction of airflow F (and the Z-axis) and may be angled between zero and forty-five degrees with respect to the Y-axis. By way of example, the accompanying drawings depict the front surface 402 as being angled zero degrees with respect to the Y-axis. Moreover, front surface 402 may be angled between zero and sixty degrees with respect to the X-axis. By way of example, the accompanying drawings depict the front surface 402 as being angled zero degrees with respect to the X-axis.

The front surface 402 includes a substantially constant height in the widthwise direction W (parallel to the X-axis) and extends between opposing lateral, vertical walls 406, 408 that extend along the Y and Z axes. These walls 406, 408 are bridged by the floor 410 and a ceiling 412, both of which extend along the X and Z axes. In exemplary form, the floor 410 comprises a planar surface, whereas the walls 406, 408 also embody planar surfaces that each extends perpendicular to the floor. It should be noted, however, that the opposing walls 406, 408 need not be planar, nor angled perpendicularly with respect to the floor 410. Likewise, it should be understood that the floor 410 need not be planar or angled perpendicularly with respect to either or both of the lateral walls 406, 408.

The top surface 413 extends along the X and Z axes and may be planar and angled approximately ninety degrees with respect to the front surface 402 (and Y axis). In exemplary form, the top surface 413 is parallel to the floor 410 and has a generally four-sided shape with opposing lateral sides delineating the depth in the Z-direction, which is approximately equal to the height of the front surface 402. In this exemplary embodiment, the lateral sides are equidistant, as are the forward and rear sides that establish the depth of the top surface 413, thereby delineating a rectangular shape. By way of example, the top surface may have a length in the Z-direction ranging from zero to the height of the front surface 402. It should be noted, however, that the top surface 413 need not embody a rectangular shape or for that matter a four sided shape. It should also be noted that the top surface 413 may be omitted so that the front surface 402 and rear surface 414 directly meet one another.

In this exemplary turbulator 400, the back surface 414 completely extends from the floor 410 to a terminal edge 426 (i.e., top edge) of the top surface 413 vertically spaced above the floor. The back surface 414 is inclined at an angle $\phi$ with respect to that Z-axis that may be constant or vary across the lateral widthwise dimension W (along the X axis). Said another way, the length of the back surface 414 (between the terminal edge 426 and the line of termination 420 in the Z-axis direction) may be uniform or may be nonuniform across the widthwise dimension W.

Figure 38:
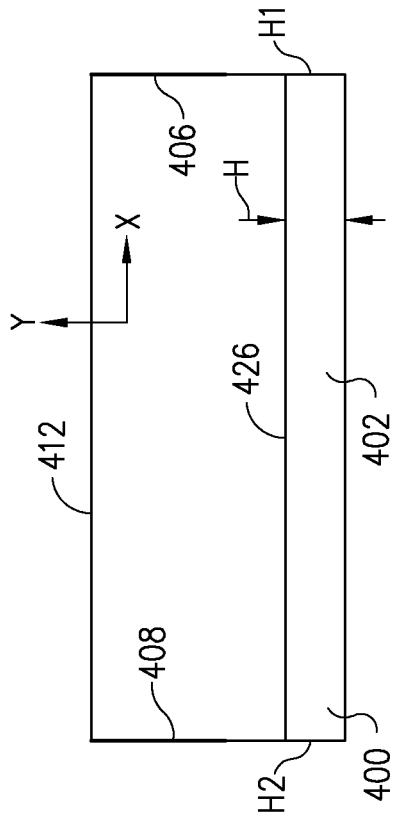
FIG. 38 is a left profile view of the first exemplary embodiment of FIG. 35.
Figure 39:
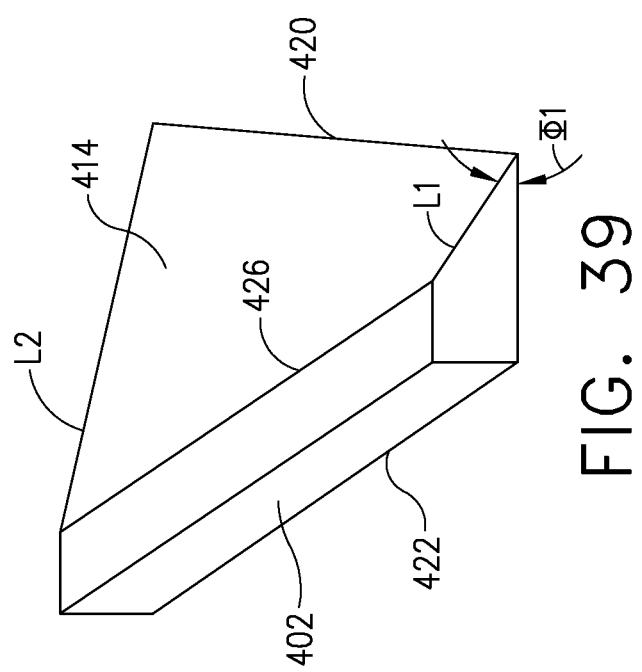
FIG. 39 is an elevated perspective view of the first exemplary embodiment of FIG. 35.

Referring specifically to FIG. 38, the angle $\phi$ may be selected to be large enough so that the turbulator 400 has a reasonable overall length in the direction of cooling air flow F, but preferably not so large that a stagnation zone would be present during operation. As an example, the angle $\phi$ may average about 30° or less. More specifically, the angle $\phi$ may average approximately 20°. By way of further example, in the case of varying angles $\phi$ across the widthwise dimension W, a first angle $\phi 1$ at one lateral edge of the turbulator 400 may be between 20 and 45 degrees, whereas the second angle $\phi 2$ at an opposing lateral edge of the turbulator 400 may be between 10 and 35 degrees. For purposes of illustration in the figures only, the first angle $\phi 1$ is 45 degrees, whereas the second angle $\phi 2$ is 25 degrees.

Referring back to FIGS. 35-39, this first exemplary turbulator 400 includes a back surface 414 with a first length $L_1$ abutting the first vertical wall 406 and a second length $L_2$ abutting the second vertical wall 408. By way of example, the first length $L_1$ is less than the second length $L_2$, which also corresponds to the angle $\phi 1$ being greater than the angle $\phi 2$. Had the second length $L_2$ been less than the first length $L_1$ in this example, the angle $\phi 2$ would have been greater than the angle $\phi 1$. Those skilled in the art will understand that the lengths $L_1$, $L_2$ may vary depending upon the angle $\phi$ chosen, and vice versa, depending upon various factors.

In this exemplary turbulator 400, the front surface 402 may be coplanar with the X-Y plane and, consistent with the differing angles $\phi 1$, $\phi 2$, the height of the turbulator may change along the Z and Y axes. In particular, the height $H_1$ of the turbulator adjacent the first lateral wall 406 (taken parallel to the Y-axis) is the same as the height $H_2$ proximate the second lateral wall 408 at the front surface. But the heights $H_1$, $H_2$ thereafter decrease (in the Z-direction) so that for a cross-section taken perpendicular to the Z-axis, such as along line 5-5 in FIG. 3, the height $H_1$ is proportionally less than the height $H_2$. Moreover, a line of termination 420 of the rear surface 414 is not parallel with a line of inception 422 at the base of the front surface 402. In circumstances where the $\phi 1$ and $\phi 2$ are identical, the line of termination 420 may be parallel to the line of inception 422, which likewise evidences a uniform length of the back surface 414 in the direction of the Z-axis.

In circumstances where particulates are deposited and the surface of the component is intended for convective heat transfer, as introduced previously, these particulates act as insulators and reduce thermal transfer between the flowing fluid and the intended heat transfer surface. In addition to being insulators, particulates also tend to accumulate more in stagnant or recirculating regions. Consequently, the combined effects of particulates within flow fields having stagnant or recirculating flows may lead to a significant reduction in the effective convective thermal transfer. By using one or more turbulators 400, areas of stagnant or recirculating airflow can be significantly reduced.

From the foregoing description, it should be apparent that the various families and embodiments of turbulators described herein are geometrically related. For example, a full-span turbulator which extends completely between the first and second lateral walls (i.e., turbulator width equals width between walls) becomes a partial span turbulator when the width of the turbulator is less than the width between the first and second lateral walls. A partial span turbulator may be a corner turbulator when it is located adjacent to one of the first or second lateral walls and has a width less than the width between the walls. A chevron turbulator becomes a simple turbulator when the width of one of the two halves of the chevron is reduced in size to zero. These and other permutations are envisioned as within the scope of the description provided herein.

Following from the foregoing description, which is provided for the purpose of illustration only and not for the purpose of limitation, it should be apparent to those of ordinary skill in the art that, while the methods and apparatuses herein described constitute exemplary embodiments of the present disclosure, the disclosure is not necessarily limited to the precise embodiments and changes may be made to such embodiments without departing from the scope of the disclosure. Additionally, it is to be understood that it is not intended that any limitations or elements describing the exemplary embodiments set forth herein are to be incorporated into the interpretation of what constitutes the disclosure unless such feature or element is explicitly stated as necessary to comprise the disclosure. Likewise, it is to be understood that it is not necessary to meet any or all of the identified advantages or objects of the foregoing exemplary embodiments in order to fall within the scope of the disclosure since inherent and/or unforeseen advantages of the present disclosure may exist even though they may not have been explicitly discussed herein.

The invention claimed is:

1. A structure for disrupting the flow of a fluid, the structure comprising:
   a first lateral wall and a second lateral wall spaced apart from one another a distance across an X-axis and joined by a floor extending along an upstream/downstream direction to define a Z-axis; and
   a turbulator extending between the first lateral wall and the second lateral wall, the turbulator extending away from the floor, the turbulator comprising:
      a first front surface extending between the first lateral wall and the second lateral wall, the first front surface extending from the floor and being transverse with respect to the Z-axis,
      a second front surface abutting the first front surface to define an apex and extending between the first lateral wall and the second lateral wall, the second front surface extending from the floor and being transverse with respect to the Z-axis, the second front surface not in parallel with the first front surface,
      wherein the first front surface and the second front surface both face an upstream direction along the Z-axis such that the apex is a furthest upstream portion of the turbulator,
      a first rear surface extending between the first lateral wall and the second lateral wall, the first rear surface extending between the first front surface and the floor, the first rear surface having an inclining section that is angled between forty-five and ten degrees with respect to a Y-axis extending perpendicular to the floor, the Y-axis being perpendicular to the Z-axis,
      a second rear surface abutting the first rear surface and extending between the first lateral wall and the second lateral wall, the second rear surface extending between the second front surface and the floor, the second rear surface having an inclining section that is angled between forty-five and ten degrees with respect to the Y-axis, where the X-axis is perpendicular to both the Y-axis and the Z-axis, and
      a sloped trough that extends from the floor to the apex, wherein the sloped trough is formed where the first rear surface, and the second rear surface meet one another.

2. The structure of claim 1, wherein the first front surface is obliquely angled with respect to the Z-axis.

3. The structure of claim 1, wherein the first front surface is angled between eighty-five and fifteen degrees with respect to the Z-axis.

4. The structure of claim 1, wherein the first front surface is angled between seventy-five and twenty-five degrees with respect to the Z-axis.

5. The structure of claim 1, wherein the first front surface is angled between sixty-five and thirty-five degrees with respect to the Z-axis.

6. The structure of claim 1, wherein the first front surface is angled between fifty-five and forty-five degrees with respect to the Z-axis.

7. The structure of claim 1, wherein the second front surface and first front surface together extend completely between the first lateral wall and the second lateral wall.

8. The structure of claim 1, wherein the second front surface is obliquely angled with respect to the Z-axis.

9. The structure of claim 1, wherein the second front surface is angled between eighty-five and fifteen degrees with respect to the Z-axis.

10. The structure of claim 1, wherein the second front surface is angled between seventy-five and twenty-five degrees with respect to the Z-axis.

11. The structure of claim 1, wherein the second front surface is angled between sixty-five and thirty-five degrees with respect to the Z-axis.

12. The structure of claim 1, wherein the second front surface is angled between fifty-five and forty-five degrees with respect to the Z-axis.

13. The structure of claim 1, wherein at least one of the first front surface and the second front surface has a height coaxial with the Y-axis that is uniform across the X-axis.

14. The structure of claim 1, wherein the first front surface has a first height coaxial with the Y-axis that is uniform across the X-axis, and the second front surface has a second height coaxial with the Y-axis that is uniform across the X-axis.

15. The structure of claim 1, wherein at least one of the first front surface and the second front surface has a height coaxial with the Y-axis that is nonuniform across the X-axis.

16. The structure of claim 1, wherein the first front surface has a first nonuniform height coaxial with the Y-axis across the X-axis, and the second front surface has a second nonuniform height coaxial with the Y-axis across the X-axis.

17. The structure of claim 1, wherein the first front surface and the second front surface are oriented in a chevron orientation.

18. The structure of claim 1, wherein the first rear surface is obliquely angled with respect to the Z-axis.

19. The structure of claim 1, wherein the first rear surface is angled between eighty-five and fifteen degrees with respect to the Y-axis.

20. The structure of claim 1, wherein the first rear surface is angled between seventy-five and twenty-five degrees with respect to the Y-axis.

21. The structure of claim 1, wherein the first rear surface is angled between sixty-five and thirty-five degrees with respect to the Y-axis.

22. The structure of claim 1, wherein the first rear surface is angled between fifty-five and forty-five degrees with respect to the Y-axis.

23. The structure of claim 1, wherein the second rear surface is obliquely angled with respect to the Y-axis.

24. The structure of claim 1, wherein the second rear surface is obliquely angled with respect to the Y-axis.

25. The structure of claim 1, wherein the second rear surface is angled between eighty-five and fifteen degrees with respect to the Y-axis.

26. The structure of claim 1, wherein the second rear surface is angled between seventy-five and twenty-five degrees with respect to the Y-axis.

27. The structure of claim 1, wherein the second rear surface is angled between sixty-five and thirty-five degrees with respect to the Y-axis.

28. The structure of claim 1, wherein the second rear surface is angled between fifty-five and forty-five degrees with respect to the Y-axis.

29. The structure of claim 1, wherein at least one of the first rear surface and the second rear surface has a uniform slope across the X-axis.

30. The structure of claim 1, wherein the first rear surface has a first uniform slope across the X-axis, and the second rear surface has a second uniform slope across the X-axis.

31. The structure of claim 1, wherein at least one of the first rear surface and the second rear surface has a slope that is nonuniform across the X-axis.

32. The structure of claim 1, wherein the first rear surface has a first nonuniform slope across the X-axis, and the second rear surface has a second nonuniform slope across the X-axis.

33. The structure of claim 1, wherein at least one of the first rear surface and the second rear surface has a uniform length across the X-axis.

34. The structure of claim 1, wherein the first rear surface has a first uniform length across the X-axis, and the second rear surface has a second uniform length across the X-axis.

35. The structure of claim 1, wherein at least one of the first rear surface and the second rear surface has a length that is nonuniform across the X-axis.

36. The structure of claim 1, wherein the first rear surface has a first nonuniform length across the X-axis, and the second rear surface has a second nonuniform length across the X-axis.

37. The structure of claim 1, wherein the first rear surface and the second rear surface are oriented in a chevron orientation.

38. The structure of claim 1, wherein the second rear surface adjoins the first rear surface.

39. The structure of claim 1, wherein an intermediary surface interposes and operatively couples at least the first front surface to the second front surface and the first rear surface to the second rear surface.

40. The structure of claim 1, wherein the first front surface and second front surface cooperate to extend completely between the first lateral wall and the second lateral wall.

41. The structure of claim 1, wherein the first rear surface and second rear surface cooperate to extend completely between the first lateral wall and the second lateral wall.

42. The structure of claim 1, wherein the first front surface and the second front surface are joined proximate a midline between the first lateral wall and the second lateral wall.

43. The structure of claim 1, wherein the first front surface and the second front surface are joined at a location more than 1.25 times as close to the first lateral wall as to the second lateral wall.

44. The structure of claim 1, wherein the first rear surface and the second rear surface are joined proximate a midline between the first lateral wall and the second lateral wall.

45. The structure of claim 1, wherein the first rear surface and the second rear surface are joined at a location more than 1.25 times as close to the first lateral wall as to the second lateral wall.

46. The structure of claim 1, wherein the turbulator comprises a plurality of turbulators.

47. The structure of claim 46, wherein the plurality of turbulators are oriented in series along the Z-axis.

48. The structure of claim 47, wherein the plurality of turbulators are uniformly spaced apart from one another.

49. The structure of claim 47, wherein the plurality of turbulators are nonuniformly spaced apart from one another.

50. The structure of claim 1, wherein the turbulator extends incompletely between the first and second lateral walls such that the turbulator has a width which is less than the distance between the first and second lateral walls, thereby forming a partial span turbulator.

51. The structure of claim 50, wherein the turbulator is adjacent to either the first or second lateral walls.

52. The structure of claim 1, wherein the second front and rear surfaces have zero width.

53. The structure of claim 52, wherein first front and rear surfaces extend completely between the first and second lateral walls.

54. The structure of claim 52, wherein the turbulator extends incompletely between the first and second lateral walls such that the turbulator has a width which is less than the distance between the first and second lateral walls, thereby forming a partial span turbulator.

55. The structure of claim 1, wherein the first front surface and second front surface extend perpendicularly from the floor.

56. A structure for disrupting the flow of a fluid, the structure comprising:
a first lateral wall and a second lateral wall spaced apart from one another a distance across an X-axis and joined by a floor extending along an upstream/downstream direction to define a Z-axis; and
a turbulator extending between the first lateral wall and the second lateral wall, the turbulator extending away from the floor, the turbulator comprising:
a first front surface extending between the first lateral wall and the second lateral wall, the first front surface extending from the floor and being transverse with respect to the Z-axis,
a second front surface abutting the first front surface to define an apex and extending between the first lateral wall and the second lateral wall, the second front surface extending from the floor and being transverse with respect to the Z-axis, the second front surface not in parallel with the first front surface,
wherein the first front surface and the second front surface both face an upstream direction along the Z-axis such that the apex is the furthest upstream portion of the turbulator,
a first rear surface extending between the first lateral wall and the second lateral wall, the first rear surface extending between the first front surface and the floor, the first rear surface having an inclining section that is angled between less than ninety and greater than or equal to ten degrees with respect to a Y-axis extending perpendicular to the floor, the Y-axis being perpendicular to the Z-axis,
a second rear surface abutting the first rear surface and extending between the first lateral wall and the second lateral wall, the second rear surface extending between the second front surface and the floor, the second rear surface having an inclining section that is angled between less than ninety and greater than or equal to ten degrees with respect to the Y-axis, where the X-axis is perpendicular to both the Y-axis and the Z-axis, and
a sloped trough that extends from the floor to the apex, wherein the sloped trough is formed where the first rear surface, and the second rear surface meet one another.

* * * * *